(12) United States Patent
Komaki et al.

(10) Patent No.: US 12,516,980 B2
(45) Date of Patent: Jan. 6, 2026

(54) LASER DEVICE, EVALUATION METHOD FOR LASER LIGHT SPECTRUM, AND ELECTRONIC DEVICE MANUFACTURING METHOD

(71) Applicant: Gigaphoton Inc., Tochigi (JP)

(72) Inventors: Takamitsu Komaki, Oyama (JP); Toshihiro Oga, Oyama (JP)

(73) Assignee: Gigaphoton Inc., Tochigi (JP)

( * ) Notice: Subject to any disclaimer, the term of this patent is extended or adjusted under 35 U.S.C. 154(b) by 209 days.

(21) Appl. No.: 18/467,121

(22) Filed: Sep. 14, 2023

(65) Prior Publication Data
US 2024/0003743 A1     Jan. 4, 2024

Related U.S. Application Data

(63) Continuation of application No. PCT/JP2021/015233, filed on Apr. 12, 2021.

(51) Int. Cl.
    G01J 3/45     (2006.01)
(52) U.S. Cl.
    CPC .................................... G01J 3/45 (2013.01)
(58) Field of Classification Search
    CPC ...... G01J 3/45; G01J 3/027; G01J 2009/0257; G01J 9/0246; G03F 7/70575;
(Continued)

(56) References Cited

U.S. PATENT DOCUMENTS 7,304,748 B2 * 12/2007 Rafac ..................... G01J 3/45
                                             356/519
7,903,700 B2 * 3/2011 Nagai ..................... H01S 3/134
                                             372/55
(Continued)

FOREIGN PATENT DOCUMENTS

JP     2004271498 A   *   9/2004
JP     2006-024855 A      1/2006
(Continued)

OTHER PUBLICATIONS

International Search Report issued in PCT/JP2021/015233; mailed Jun. 22, 2021.
(Continued)

*Primary Examiner* — Kara E. Geisel
*Assistant Examiner* — Roberto Fabian, Jr.
(74) *Attorney, Agent, or Firm* — Studebaker Brackett PLLC

(57) ABSTRACT

A laser device connectable to an exposure apparatus includes a spectrometer configured to generate a measurement waveform from an interference pattern of laser light output from the laser device; and a processor configured to calculate a first spectral waveform indicating a relationship between a wavelength and a light intensity using the measurement waveform, calculate a representative waveform included in a wavelength range of the first spectral waveform, and calculate an evaluation value of the first spectral waveform using a first integration value obtained by integrating, over the wavelength range, a product of a function of a wavelength deviation from the representative wavelength and the light intensity.

20 Claims, 15 Drawing Sheets

(58) Field of Classification Search
CPC ........ G03F 7/70025; H01S 3/225; H01S 3/08; H01S 3/08004; H01S 3/0809; H01S 3/08009; H01S 3/10069; H01S 3/1055; H01S 3/1305; H01S 3/136; H01S 3/137
See application file for complete search history.

(56) References Cited

U.S. PATENT DOCUMENTS

| | | |
|---|---|---|
| 2004/0263861 A1 | 12/2004 | Rafac |
| 2008/0285602 A1 | 11/2008 | Nagai et al. |
| 2011/0200922 A1 | 8/2011 | Köhler et al. |
| 2012/0057144 A1 | 3/2012 | De Kruif et al. |
| 2018/0254600 A1 | 9/2018 | Kumazaki et al. |
| 2020/0274315 A1 | 8/2020 | Ishida et al. |

FOREIGN PATENT DOCUMENTS

| | | | | |
|---|---|---|---|---|
| JP | 2007-536498 A | 12/2007 | | |
| WO | WO-2017098625 A1 * | 6/2017 | .............. | G01J 3/027 |
| WO | 2019/111315 A1 | 6/2019 | | |

OTHER PUBLICATIONS

International Preliminary Report On Patentability and Written Opinion issued in PCT/JP2021/015233; issued Oct. 12, 2023.

* cited by examiner $$V = \frac{\int I(\lambda)(\lambda - \lambda c)^2 \, d\lambda}{\int I(\lambda) \, d\lambda}$$

LASER DEVICE, EVALUATION METHOD FOR LASER LIGHT SPECTRUM, AND ELECTRONIC DEVICE MANUFACTURING METHOD

CROSS-REFERENCE TO RELATED APPLICATIONS

The present application claims the benefit of International Application No. PCT/JP2021/015233, filed on Apr. 12, 2021, the entire contents of which are hereby incorporated by reference.

BACKGROUND

1. Technical Field

The present disclosure relates to a laser device, an evaluation method for laser light spectrum, and an electronic device manufacturing method.

2. Related Art

Recently, in a semiconductor exposure apparatus, improvement in resolution has been desired for miniaturization and high integration of semiconductor integrated circuits. For this purpose, an exposure light source that outputs light having a shorter wavelength has been developed. For example, as a gas laser device for exposure, a KrF excimer laser device for outputting laser light having a wavelength of about 248 nm and an ArF excimer laser device for outputting laser light having a wavelength of about 193 nm are used.

The KrF excimer laser device and the ArF excimer laser device each have a large spectral line width of about 350 to 400 pm in natural oscillation light. Therefore, when a projection lens is formed of a material that transmits ultraviolet rays such as KrF laser light and ArF laser light, there is a case in which chromatic aberration occurs. As a result, the resolution may decrease. Then, a spectral line width of laser light output from the gas laser device needs to be narrowed to the extent that the chromatic aberration can be ignored. For this purpose, there is a case in which a line narrowing module (LNM) including a line narrowing element (etalon, grating, and the like) is provided in a laser resonator of the gas laser device to narrow a spectral line width. In the following, a gas laser device with a narrowed spectral line width is referred to as a line narrowing gas laser device.

LIST OF DOCUMENTS

Patent Documents

Patent Document 1: US Patent Application Publication No. 2011/200922
Patent Document 2: US Patent Application Publication No. 2012/057144

SUMMARY

A laser device connectable to an exposure apparatus according to an aspect of the present disclosure includes a spectrometer configured to generate a measurement waveform from an interference pattern of laser light output from the laser device; and a processor configured to calculate a first spectral waveform indicating a relationship between a wavelength and a light intensity using the measurement waveform, calculate a representative waveform included in a wavelength range of the first spectral waveform, and calculate an evaluation value of the first spectral waveform using a first integration value obtained by integrating, over the wavelength range, a product of a function of a wavelength deviation from the representative wavelength and the light intensity.

An evaluation method for laser light spectrum according to an aspect of the present disclosure includes generating a measurement waveform from an interference pattern of laser light output from a laser device connectable to an exposure apparatus; calculating a first spectral waveform indicating a relationship between a wavelength and a light intensity using the measurement waveform; calculating a representative wavelength included in a wavelength range of the first spectral waveform; and calculating an evaluation value of the first spectral waveform using a first integration value obtained by integrating, over the wavelength range, a product of a function of a wavelength deviation from the representative wavelength and the light intensity.

An electronic device manufacturing method according to an aspect of the present disclosure includes generating laser light using a laser device, outputting the laser light to an exposure apparatus, and exposing a photosensitive substrate to the laser light in the exposure apparatus to manufacture an electronic device. Here, the laser device includes a spectrometer configured to generate a measurement waveform from an interference pattern of the laser light output from the laser device connectable to the exposure apparatus; and a processor configured to calculate a first spectral waveform indicating a relationship between a wavelength and a light intensity using the measurement waveform, calculate a representative waveform included in a wavelength range of the first spectral waveform, and calculate an evaluation value of the first spectral waveform using a first integration value obtained by integrating, over the wavelength range, a product of a function of a wavelength deviation from the representative wavelength and the light intensity.

BRIEF DESCRIPTION OF THE DRAWINGS

Embodiments of the present disclosure will be described below merely as examples with reference to the accompanying drawings.

DESCRIPTION OF EMBODIMENTS

Contents

Figure 1:
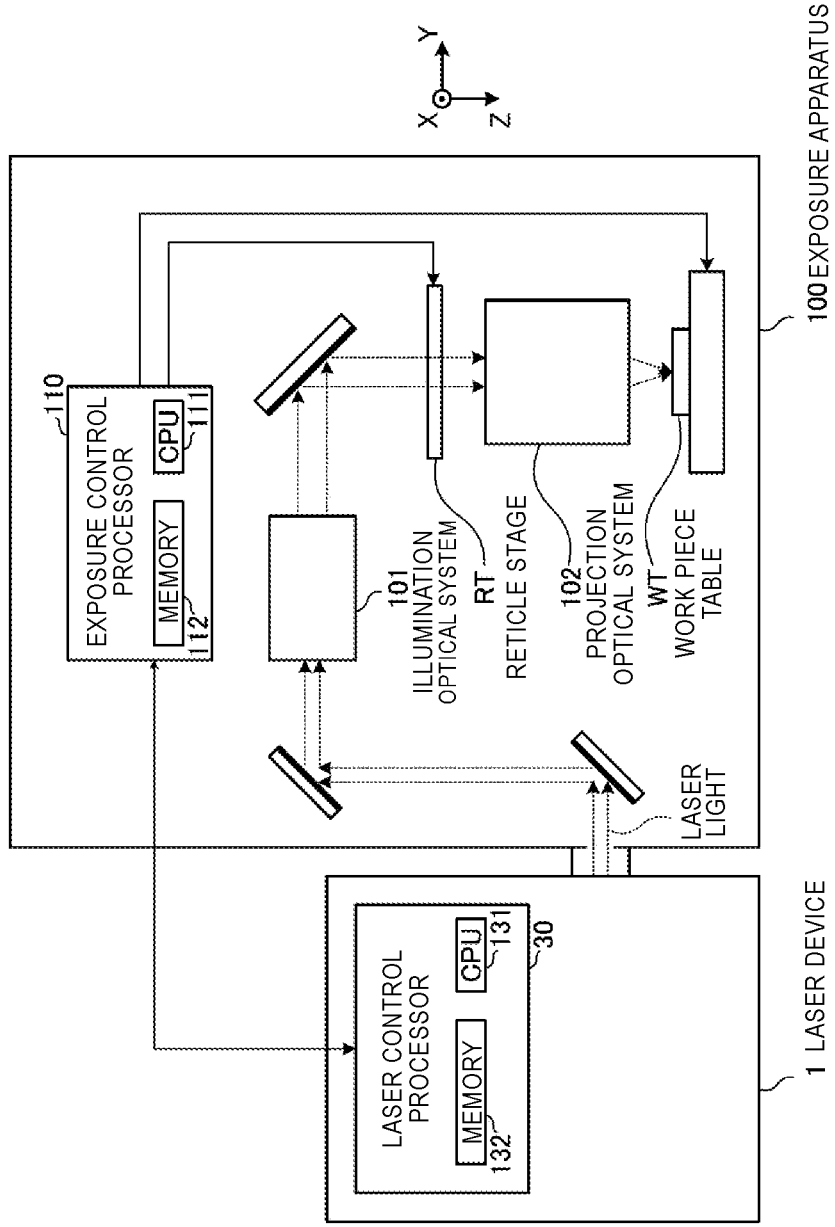
FIG. 1 schematically shows the configuration of an exposure system according to a comparative example.

1. Comparative example
    1.1 Configuration of exposure apparatus 100
    1.2 Operation of exposure apparatus 100
    1.3 Configuration of laser device 1
        1.3.1 Laser oscillator 20
        1.3.2 Monitor module 16
        1.3.3 Various processing devices
    1.4 Operation
        1.4.1 Laser control processor 30
        1.4.2 Laser oscillator 20
        1.4.3 Monitor module 16
        1.4.4 Wavelength measurement control unit 50
        1.4.5 Spectrum measurement control processor 60
    1.5 Problem of comparative example
2. Laser device 1a which calculates spectrum evaluation value V by integrating product of estimation spectral waveform $I(\lambda)$ and function $(\lambda-\lambda c)^2$ of wavelength deviation
    2.1 Configuration
    2.2 Measurement operation of spectrum evaluation value V
    2.3 Comparison with spectral line width E95
    2.4 Modification of spectrum evaluation value V
    2.5 Operation of spectrum control
    2.6 Modification of spectral waveform adjuster
        2.6.1 Configuration
        2.6.2 Operation
        2.6.3 Other configuration examples
    2.7 Effect
3. Others Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. COMPARATIVE EXAMPLE

FIG. 1 schematically shows the configuration of an exposure system according to a comparative example. The comparative example of the present disclosure is an example recognized by the applicant as known only by the applicant, and is not a publicly known example admitted by the applicant.

The exposure system includes a laser device 1 and an exposure apparatus 100. The laser device 1 includes a laser control processor 30. The laser control processor 30 is a processing device including a memory 132 in which a control program is stored, and a central processing unit (CPU) 131 which executes the control program. The laser control processor 30 is specifically configured or programmed to perform various processes included in the present disclosure. The laser device 1 is configured to output laser light toward the exposure apparatus 100.

1.1 Configuration of Exposure Apparatus 100

The exposure apparatus 100 includes an illumination optical system 101, a projection optical system 102, and an exposure control processor 110.

The illumination optical system 101 illuminates a reticle pattern of a reticle (not shown) arranged on a reticle stage RT with laser light incident from the laser device 1.

The projection optical system 102 causes the laser light transmitted through the reticle to be imaged as being reduced and projected on a workpiece (not shown) arranged on a workpiece table WT. The workpiece is a photosensitive substrate such as a semiconductor wafer on which a resist film is applied.

The exposure control processor 110 is a processing device including a memory 112 in which the control program is stored and a CPU 111 which executes the control program. The exposure control processor 110 is specifically configured or programmed to perform various processes included in the present disclosure. The exposure control processor 110 performs overall control of the exposure apparatus 100 and transmits and receives various data and various signals to and from the laser control processor 30.

1.2 Operation of Exposure Apparatus 100

The exposure control processor 110 transmits data of a target value of the wavelength, data of a target value of the pulse energy, and a trigger signal to the laser control processor 30. The laser control processor 30 controls the laser device 1 in accordance with these data and signals.

The exposure control processor 110 synchronously translates the reticle stage RT and the workpiece table WT in opposite directions with each other. Thus, the workpiece is exposed to the laser light reflecting the reticle pattern.

Through the exposure process as described above, the reticle pattern is transferred onto the semiconductor wafer. Thereafter, an electronic device can be manufactured through a plurality of processes.

1.3 Configuration of Laser Device 1

Figure 2:
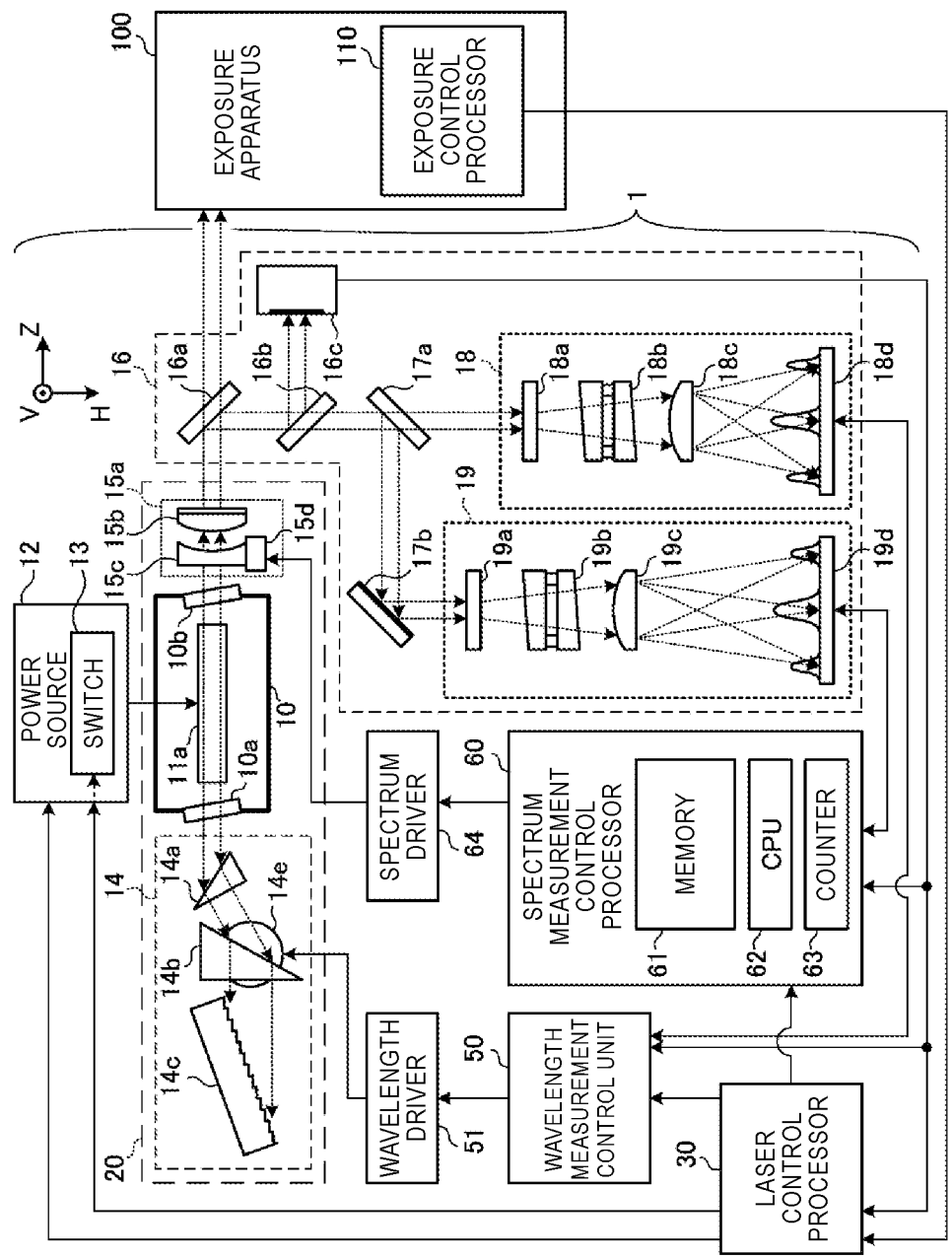
FIG. 2 schematically shows the configuration of a laser device according to the comparative example.

FIG. 2 schematically shows the configuration of the laser device 1 according to the comparative example. The laser device 1 includes a laser oscillator 20, a power source 12, a monitor module 16, the laser control processor 30, a wavelength measurement control unit 50, and a spectrum measurement control processor 60. The laser device 1 is connectable to the exposure apparatus 100.

1.3.1 Laser Oscillator 20

The laser oscillator 20 includes a laser chamber 10, a discharge electrode 11a, a line narrowing module 14, and a spectral waveform adjuster 15a.

The line narrowing module 14 and the spectral waveform adjuster 15a configure a laser resonator. The laser chamber is arranged on the optical path of the laser resonator. Windows 10a, 10b are provided at both ends of the laser chamber 10. The discharge electrode 11a and a discharge electrode (not shown) paired with the discharge electrode 11a are arranged inside the laser chamber 10. The discharge electrode (not shown) is positioned so as to overlap with the discharge electrode 11a along a V axis perpendicular to the paper surface. The laser chamber 10 is filled with a laser gas containing, for example, an argon gas or a krypton gas as a rare gas, a fluorine gas as a halogen gas, a neon gas as a buffer gas, and the like.

The power source 12 includes a switch 13 and is connected to the discharge electrode 11a and a charger (not shown).

The line narrowing module 14 includes a plurality of prisms 14a, 14b and a grating 14c. The prism 14b is supported by a rotation stage 14e. The rotation stage 14e is configured to rotate the prism 14b about an axis parallel to the V axis in accordance with a drive signal output from a wavelength driver 51. By rotating the prism 14b, the selected wavelength of the line narrowing module 14 is changed.

The spectral waveform adjuster 15a includes a cylindrical plano-convex lens 15b, a cylindrical plano-concave lens 15c, and a linear stage 15d. The cylindrical plano-concave lens 15c is located between the laser chamber and the cylindrical plano-convex lens 15b.

The cylindrical plano-convex lens 15b and the cylindrical plano-concave lens 15c are arranged such that the convex surface of the cylindrical plano-convex lens 15b and the concave surface of the cylindrical plano-concave lens 15c face each other. The convex surface of the cylindrical plano-convex lens 15b and the concave surface of the cylindrical plano-concave lens 15c each have a focal axis parallel to the V-axis direction. The planar surface of the cylindrical plano-convex lens 15b opposite to the convex surface is coated with a partial reflection film.

1.3.2 Monitor Module 16

The monitor module 16 is arranged on the optical path of the laser light between the spectral waveform adjuster and the exposure apparatus 100. The monitor module 16 includes beam splitters 16a, 16b, 17a, an energy sensor 16c, a high reflection mirror 17b, a wavelength detector 18, and a spectrometer 19.

The beam splitter 16a is located on the optical path of the laser light output from the spectral waveform adjuster 15a. The beam splitter 16a is configured to transmit part of the laser light output from the spectral waveform adjuster toward the exposure apparatus 100 at a high transmittance and to reflect the other part thereof. The beam splitter 16b is located on the optical path of the laser light reflected by the beam splitter 16a. The energy sensor 16c is located on the optical path of the laser light reflected by the beam splitter 16b.

The beam splitter 17a is located on the optical path of the laser light transmitted through the beam splitter 16b. The high reflection mirror 17b is located on the optical path of the laser light reflected by the beam splitter 17a.

The wavelength detector 18 is arranged on the optical path of the laser light transmitted through the beam splitter 17a. The wavelength detector 18 includes a diffusion plate 18a, an etalon 18b, a light concentrating lens 18c, and a line sensor 18d.

The diffusion plate 18a is located on the optical path of the laser light transmitted through the beam splitter 17a. The diffusion plate 18a has a number of irregularities on the surface thereof and is configured to transmit and diffuse the laser light.

The etalon 18b is located on the optical path of the laser light transmitted through the diffusion plate 18a. The etalon 18b includes two partial reflection mirrors. The two partial reflection mirrors face each other with an air gap of a predetermined distance therebetween, and are bonded to each other with a spacer interposed therebetween.

The light concentrating lens 18c is located on the optical path of the laser light transmitted through the etalon 18b.

The line sensor 18d is located on the optical path of the laser light transmitted through the light concentrating lens 18c and on the focal plane of the light concentrating lens 18c. The line sensor 18d is a light distribution sensor including a large number of light receiving elements arranged in one dimension. Alternatively, instead of the line sensor 18d, an image sensor including a large number of light receiving elements arranged in two dimensions may be used as the light distribution sensor. The line sensor 18d may include a processor (not shown).

The line sensor 18d receives interference fringes formed by the etalon 18b and the light concentrating lens 18c. The interference fringes are an interference pattern of the laser light, has a concentric circle shape, and a square of the distance from the center of the concentric circle is proportional to a change in the wavelength. The processor (not shown) may be configured to statistically process and output data reflecting the interference pattern.

The spectrometer 19 is arranged on the optical path of the laser light reflected by the high reflection mirror 17b. The spectrometer 19 includes a diffusion plate 19a, an etalon 19b, a light concentrating lens 19c, and a line sensor 19d. The line sensor 19d may include a processor (not shown). The configurations of the above are similar to those of the diffusion plate 18a, the etalon 18b, the light concentrating lens 18c, and the line sensor 18d included in the wavelength detector 18. However, the etalon 19b has a smaller free spectral range than the etalon 18b. Further, the light concentrating lens 19c has a longer focal length than the light concentrating lens 18c.

1.3.3 Various Processing Devices

The spectrum measurement control processor 60 is a processing device including a memory 61 in which the control program is stored, a CPU 62 which executes the control program, and a counter. The spectrum measurement control processor 60 is specifically configured or programmed to perform various processes included in the present disclosure. The spectrum measurement control processor 60 corresponds to the processor in the present disclosure.

The memory 61 also stores various data for calculating the spectral line width. The various data include an instrument function $S(\lambda)$ of the spectrometer 19. The counter 63 counts the number of pulses of the laser light by counting the number of times of reception of the electric signal including the data of the pulse energy output from the energy sensor 16c. Alternatively, the counter 63 may count the number of pulses of the laser light by counting the oscillation trigger signal output from the laser control processor 30.

The wavelength measurement control unit 50 is a processor including a memory (not shown) in which a control program is stored, a CPU (not shown) which executes the control program, and a counter (not shown). Similarly to the counter 63, the counter included in the wavelength measurement control unit 50 counts the number of pulses of the laser light.

In the present disclosure, the laser control processor 30, the wavelength measurement control unit 50, and the spectrum measurement control processor 60 are described as separate components. However, the laser control processor 30 may also serve as the wavelength measurement control unit 50 and the spectrum measurement control processor 60.

1.4 Operation
1.4.1 Laser Control Processor 30

The laser control processor 30 receives setting data of the target pulse energy and the target wavelength of the laser light from the exposure control processor 110 included in the exposure apparatus 100.

The laser control processor 30 receives the trigger signal from the exposure control processor 110.

The laser control processor 30 transmits setting data of an application voltage to be applied to the discharge electrode 11a to the power source 12 based on the target pulse energy. The laser control processor 30 transmits the setting data of the target wavelength to the wavelength measurement control unit 50. Further, the laser control processor 30 transmits the oscillation trigger signal based on the trigger signal to the switch 13 included in the power source 12.

1.4.2 Laser Oscillator 20

When receiving the oscillation trigger signal from the laser control processor 30, the switch 13a is turned on. When the switch 13 is turned on, the power source 12 generates a pulse high voltage from the electric energy charged in the charger (not shown), and applies the high voltage to the discharge electrode 11a.

When the high voltage is applied to the discharge electrode 11a, discharge occurs in the laser chamber 10. The laser medium in the laser chamber 10 is excited by the energy of the discharge and shifts to a high energy level. When the excited laser medium then shifts to a low energy level, light having a wavelength corresponding to the difference between the energy levels is emitted.

The light generated in the laser chamber 10 is output to the outside of the laser chamber 10 through the windows 10a, 10b. The beam width of the light output through the window 10a of the laser chamber 10 is expanded by the prisms 14a, 14b, and then the light is incident on the grating 14c.

The light incident on the grating 14c from the prisms 14a, 14b is reflected by a plurality of grooves of the grating 14c and is diffracted in a direction corresponding to the wavelength of the light.

The prisms 14a, 14b reduce the beam width of the diffracted light from the grating 14c and return the light to the laser chamber 10 through the window 10a.

The spectral waveform adjuster 15 transmits and outputs part of the light output from the window 10b of the laser chamber 10, and reflects the other part back into the laser chamber 10 through the window 10b.

In this way, the light output from the laser chamber reciprocates between the line narrowing module 14 and the spectral waveform adjuster 15, and is amplified each time the light passes through the discharge space in the laser chamber 10. The light is line narrowed each time being turned back in the line narrowing module 14. Thus, the light having undergone laser oscillation and line narrowing is output as laser light from the spectral waveform adjuster 15a.

The linear stage 15d included in the spectral waveform adjuster 15 moves the cylindrical plano-concave lens 15c along the optical path between the laser chamber 10 and the cylindrical plano-convex lens 15b in accordance with a drive signal output from the spectrum driver 64. Thus, the wavefront of the light traveling from the spectral waveform adjuster 15a toward the line narrowing module 14 changes. As the wavefront changes, the spectral waveform and the spectral line width of the laser light change.

1.4.3 Monitor Module 16

The energy sensor 16c detects the pulse energy of the laser light and outputs data of the pulse energy to the laser control processor 30, the wavelength measurement control unit 50, and the spectrum measurement control processor 60. The data of the pulse energy is used by the laser control processor 30 to perform feedback control of the setting data of the application voltage to be applied to the discharge electrode 11a. The electric signal including the data of the pulse energy can be used by the wavelength measurement control unit 50 and the spectrum measurement control processor 60 respectively to count the number of pulses.

The wavelength detector 18 generates waveform data of the interference fringes from the amount of light in each of the light receiving elements included in the line sensor 18d. The wavelength detector 18 may use the integrated waveform obtained by integrating the amount of light in each of the light receiving elements as the waveform data of the interference fringes. The wavelength detector 18 may generate the integrated waveform a plurality of times and use an average waveform obtained by averaging the plurality of integrated waveforms as the waveform data of the interference fringes.

The wavelength detector 18 transmits the waveform data of the interference fringes to the wavelength measurement control unit 50 in accordance with a data output trigger output from the wavelength measurement control unit 50.

The spectrometer 19 generates a raw waveform that reflects the amount of light in each of the light receiving elements included in the line sensor 19d that has received the interference fringes. Alternatively, the spectrometer 19 generates an integrated waveform Oi obtained by integrating the raw waveforms over Ni pulses. The spectrometer 19 generates the integrated waveform Oi Na times and generates an average waveform Oa obtained by averaging the Na integrated waveforms Oi. The number of integrated pulses Ni is, for example, 5 pulses or more and 8 pulses or less, and the averaging number Na is, for example, 5 times or more and 8 times or less.

The counting of the number of integrated pulses Ni and the averaging number Na may be performed by the spectrum measurement control processor 60, and the spectrometer 19 may generate the integrated waveform Oi and the average waveform Oa in accordance with a trigger signal output from the spectrum measurement control processor 60. The memory 61 of the spectrum measurement control processor 60 may store the setting data of the number of integrated pulses Ni and the averaging number Na. At least one of the raw waveform, the integrated waveform Oi, and the average waveform Oa corresponds to the measurement waveform in the present disclosure.

The spectrometer 19 extracts a part of the waveform corresponding to a free spectral range from the average waveform Oa. The extracted part of the waveform shows the relationship between the distance from the center of the concentric circles constituting the interference fringes and the light intensity. The spectrometer 19 acquires a measurement spectral waveform $O(\lambda)$ by performing coordinate conversion of the waveform into the relationship between the wavelength and the light intensity. The coordinate conversion of a part of the average waveform Oa into the relationship between the wavelength and the light intensity is also referred to as mapping to a spectral space. The measurement spectral waveform $O(\lambda)$ corresponds to the second spectral waveform in the present disclosure.

The spectrometer 19 transmits the measurement spectral waveform $O(\lambda)$ to the spectrum measurement control processor 60 in accordance with a data output trigger output from the spectrum measurement control processor 60.

Any or all of the process of calculating the integrated waveform Oi, the process of calculating the average waveform Oa, and the process of acquiring the measurement spectral waveform $O(\lambda)$ by mapping to the spectral space may be performed by the spectrum measurement control processor 60 instead of by the spectrometer 19. Both the process of generating the average waveform Oa and the process of acquiring the measurement spectral waveform $O(\lambda)$ may be performed by the spectrum measurement control processor 60 instead of by the spectrometer 19.

1.4.4 Wavelength Measurement Control Unit 50

The wavelength measurement control unit 50 receives the setting data of the target wavelength from the laser control processor 30. Further, the wavelength measurement control unit 50 calculates the center wavelength of the laser light using the waveform data of the interference fringes output from the wavelength detector 18. The wavelength measurement control unit 50 outputs a control signal to the wavelength driver 51 based on the target wavelength and the calculated center wavelength, thereby performing feedback control of the center wavelength of the laser light.

1.4.5 Spectrum Measurement Control Processor 60

The spectrum measurement control processor 60 receives the measurement spectral waveform $O(\lambda)$ from the spectrometer 19. Alternatively, the spectrum measurement control processor 60 may receive the raw waveforms from the spectrometer 19, integrate and average the raw waveforms, perform mapping to the spectral space, and acquire the measurement spectral waveform $O(\lambda)$. Alternatively, the spectrum measurement control processor 60 may receive the integrated waveforms Oi from the spectrometer 19, average the integrated waveforms Oi, perform mapping to the spectral space, and acquire the measurement spectral waveform $O(\lambda)$. Alternatively, the spectrum measurement control processor 60 may receive the average waveform Oa from the spectrometer 19, perform mapping of the average waveform Oa to the spectral space, and acquire the measurement spectral waveform $O(\lambda)$.

The spectrum measurement control processor 60 calculates an estimation spectral waveform $I(\lambda)$ from the measurement spectral waveform $O(\lambda)$ in the following manner.

Figure 3:
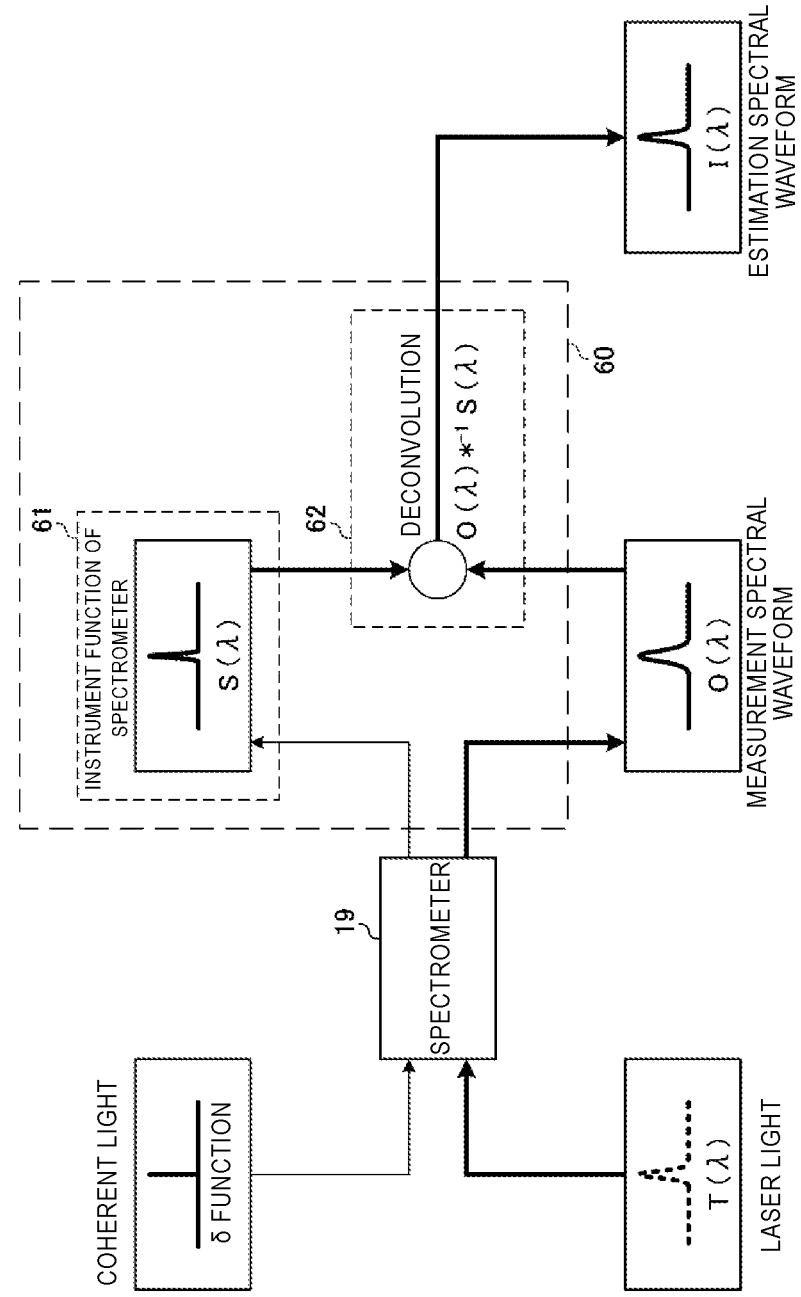
FIG. 3 is a block diagram for explaining the function of a spectrum measurement control processor in the comparative example.

FIG. 3 is a block diagram for explaining the function of the spectrum measurement control processor 60 in the comparative example.

The spectrometer 19 has a measurement characteristic unique thereto, which is represented by an instrument function $S(\lambda)$ as a function of the wavelength $\lambda$. Here, the measurement spectral waveform $O(\lambda)$ when the laser light having an unknown spectral waveform $T(\lambda)$ is incident on the spectrometer 19 having the instrument function $S(\lambda)$ and measured is represented by a convolution of the unknown spectral waveform $T(\lambda)$ and the instrument function $S(\lambda)$ as Equation 1 described below.

$$O(\lambda)=\int_{-\infty}^{\infty}(T(x)\cdot S(\lambda-x)d\lambda \quad \text{[Equation 1]}$$

That is, the convolution means a composite product of two functions.

The convolution can be represented using the symbol * as follows.

$$O(\lambda)=T(\lambda)*S(\lambda)$$

The Fourier transform $F(O(\lambda))$ of the measurement spectral waveform $O(\lambda)$ is equal to the product of the Fourier transforms $F(T(\lambda))$, $F(S(\lambda))$ of the two functions $T(\lambda)$, $S(\lambda)$, respectively, as follows.

$$F(O(\lambda))=F(T(\lambda))\times F(S(\lambda))$$

This is called the convolution theorem.

The spectrum measurement control processor 60 measures the instrument function $I(\lambda)$ of the spectrometer 19 in advance and stores the instrument function $I(\lambda)$ in the memory 61. In order to measure the instrument function $S(\lambda)$, coherent light having substantially the same wavelength as the center wavelength of the laser light output from the laser device 1 and having a narrow spectral line width that can be substantially regarded as a $\delta$ function is caused to enter the spectrometer 19. The measurement spectral waveform of the coherent light by the spectrometer 19 can be set as the instrument function $S(\lambda)$.

The CPU 62 included in the spectrum measurement control processor 60 performs deconvolution on the measurement spectral waveform $O(\lambda)$ of the laser light with the instrument function $S(\lambda)$ of the spectrometer 19. The deconvolution means an arithmetic process for estimating an unknown function satisfying the equation of convolution. The waveform obtained by deconvolution is referred to as the estimation spectral waveform $I(\lambda)$. The estimation spectral waveform $I(\lambda)$ corresponds to the first spectral waveform in the present disclosure, and shows the relationship between the wavelength of the estimated unknown spectral waveform $T(\lambda)$ and the light intensity. The estimation spectral waveform $I(\lambda)$ is expressed as follows using the symbol $*^{-1}$ representing deconvolution.

$$I(\lambda)=O(\lambda)*^{-1}S(\lambda)$$

Deconvolution can be calculated theoretically as follows. First, the following equation is derived from the convolution theorem.

$$F(I(\lambda))=F(O(\lambda))/F(S(\lambda))$$

By performing the inverse Fourier transform on both sides of this equation, the calculation result of deconvolution is obtained. That is, assuming that the symbol of the inverse Fourier transform is $F^{-1}$, the estimation spectral waveform $I(\lambda)$ is expressed as follows.

$$I(\lambda)=F^{-1}(F(O(\lambda))/F(S(\lambda)))$$

Here, in the actual numerical calculation, deconvolution using the Fourier transform and the inverse Fourier transform is easily affected by noise components included in the measurement data. Therefore, it is desirable to calculate deconvolution using an iterative method, such as the Jacobi method and the Gauss Seidel method, which can suppress the influence of noise components.

Figure 4:
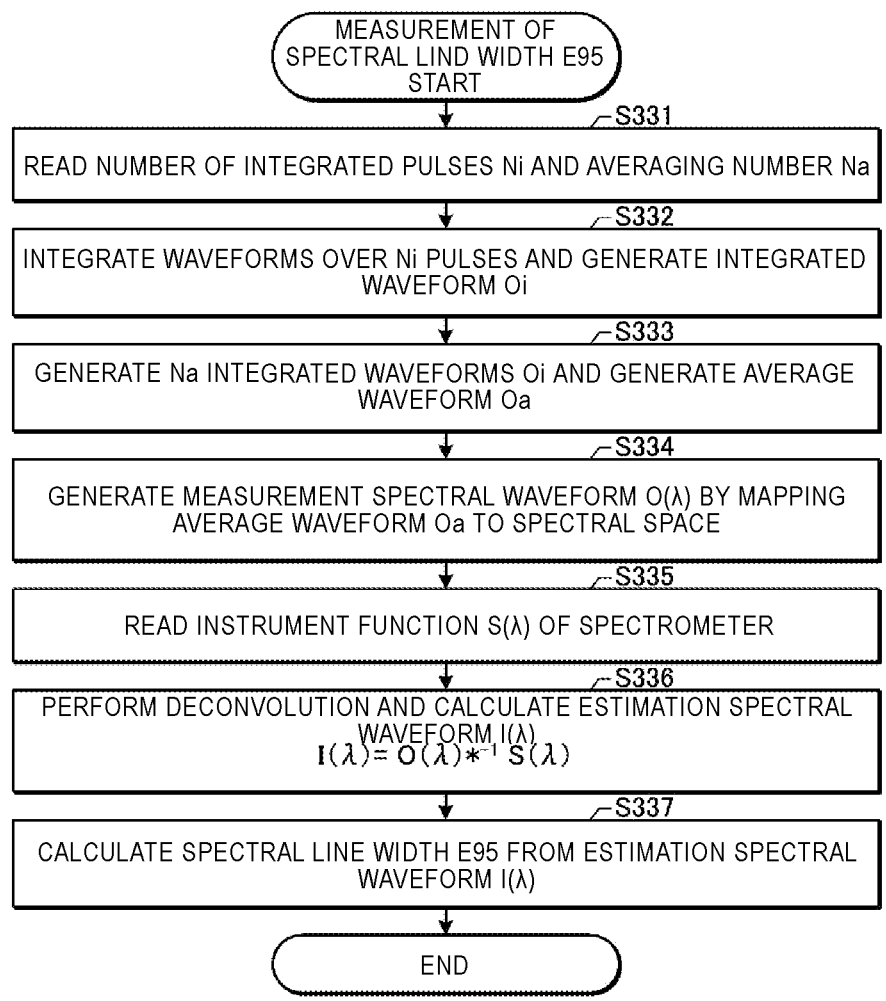
FIG. 4 is a flowchart showing the procedure of measuring a spectral line width E95 in the comparative example.

FIG. 4 is a flowchart showing the procedure of measuring the spectral line width E95 in the comparative example. The spectrum measurement control processor 60 generates the integrated waveform Oi and the average waveform Oa from the interference pattern of the laser light in the following manner, and calculates the estimation spectral waveform $I(\lambda)$ and the spectral line width E95. Definition of the spectral line width E95 will be described later with reference to FIG. 5.

In S331, the spectrum measurement control processor 60 reads the number of integrated pulses Ni and the averaging number Na from the memory 61.

In S332, the spectrum measurement control processor 60 receives the raw waveforms reflecting the amount of light in each of the light receiving elements included in the line sensor 19d, integrates the raw waveforms over Ni pulses, and generates the integrated waveform Oi.

In S333, the spectrum measurement control processor 60 generates the integrated waveform Oi Na times, and generates the average waveform Oa obtained by averaging the Na integrated waveforms Oi.

In S334, the spectrum measurement control processor 60 generates the measurement spectral waveform $O(\lambda)$ by mapping the average waveform Oa to the spectral space.

In S335, the spectrum measurement control processor 60 reads the instrument function $S(\lambda)$ of the spectrometer 19 from the memory 61.

In S336, the spectrum measurement control processor 60 calculates the estimation spectral waveform $I(\lambda)$ by performing deconvolution on the measurement spectral waveform $O(\lambda)$ with the instrument function $S(\lambda)$.

In S337, the spectrum measurement control processor 60 calculates the spectral line width E95 from the estimation spectral waveform $I(\lambda)$. The calculated spectral line width may not be E95 and may be full width at half maximum.

After S337, the spectrum measurement control processor 60 ends processing of the present flowchart.

The spectrum measurement control processor 60 receives the target value of the spectral line width E95 from the exposure control processor 110 via the laser control processor 30. The spectrum measurement control processor 60 transmits a control signal to the spectrum driver 64 based on the target value of the spectral line width E95 and the calculated spectral line width E95 to control the spectral waveform adjuster 15a, thereby performing feedback control of the spectral line width E95.

Figure 5:
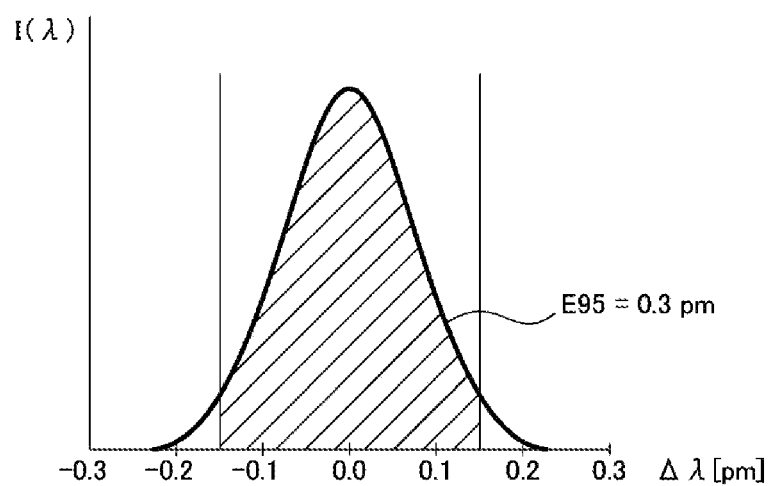
FIG. 5 is a graph showing an example of an estimation spectral waveform $I(\lambda)$ of laser light.

FIG. 5 is a graph showing an example of the estimation spectral waveform $I(\lambda)$ of the laser light. In FIG. 5, the horizontal axis represents a wavelength deviation $\Delta\lambda$, from the center wavelength. The estimation spectral waveform $I(\lambda)$ is a waveform indicating the light intensity for each wavelength component included in the wavelength range of the estimation spectral waveform $I(\lambda)$. A value obtained by integrating the estimation spectral waveform $I(\lambda)$ in a certain wavelength range is referred to as a spectral energy in the wavelength range. The full width of a part that occupies 95% of the spectral energy of the entire wavelength range of the estimation spectral waveform $I(\lambda)$ is referred to as the spectral line width E95. FIG. 5 shows the estimation spectral waveform $I(\lambda)$ of the laser light having a spectral line width E95 of 0.3 pm.

Since the refraction angle at the surface of the lens differs depending on the wavelength of the laser light, the exposure performance in the exposure apparatus 100 varies when the spectral waveform varies. By controlling the spectral line width E95 based on the target value, the exposure performance can be stabilized.

1.5 Problem of Comparative Example

Figure 6:
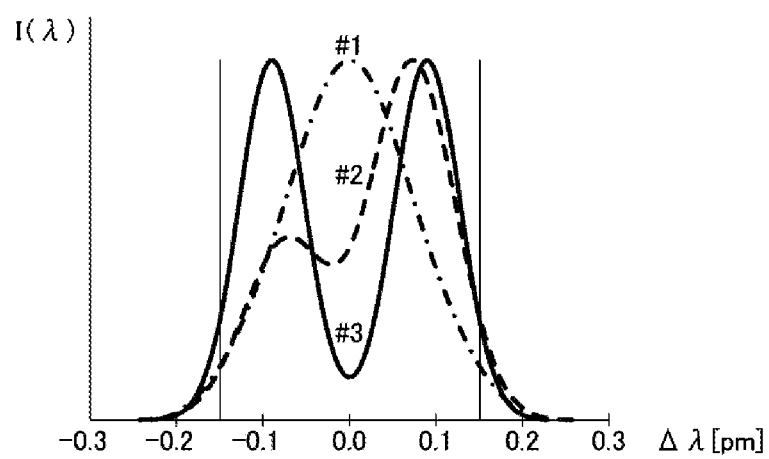
FIG. 6 is a graph showing other examples of a spectral waveform of the laser light.

FIG. 6 is a graph showing other examples of the spectral waveform of the laser light. In FIG. 6, the horizontal axis represents the wavelength deviation $\Delta\lambda$, from the center wavelength. Although the spectral line width E95 of spectral waveforms #1 to #3 shown in FIG. 6 are all 0.3 pm, the spectral waveforms #1 to #3 differ in shapes from each other. The spectral waveform #1 is a spectral distribution in which the center wavelength and the peak wavelength coincide with each other. The spectral waveform #2 is an asymmetric spectral distribution in which the peak wavelength is shifted to a longer wavelength side with respect to the center wavelength. The center wavelength referred to herein is, for example, the center of the wavelength range having a light intensity equal to or more than $1/e^2$ of the peak intensity. The spectral waveform #3 is a symmetrical spectral distribution with two separated peak wavelengths.

Figure 7:
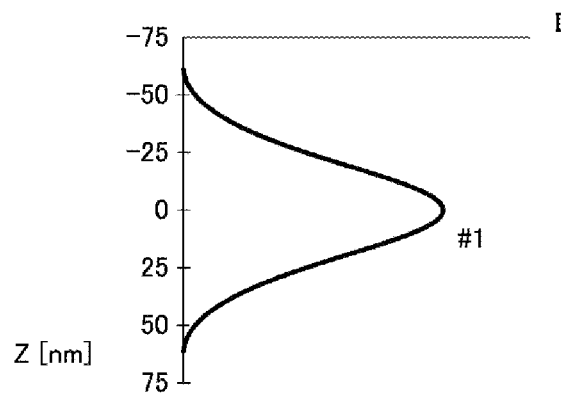
FIG. 7 is a graph showing the distribution of a focus position, in an exposure apparatus, of the laser light indicated by a spectral waveform #1 shown in FIG. 6.
Figure 8:
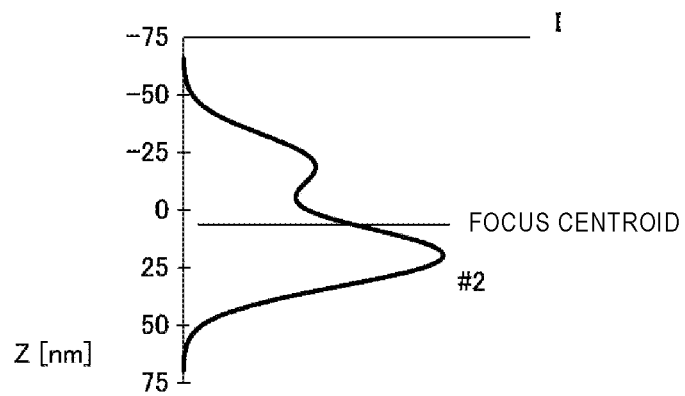
FIG. 8 is a graph showing the distribution of the focus position, in the exposure apparatus, of the laser light indicated by a spectral waveform #2 shown in FIG. 6.
Figure 9:
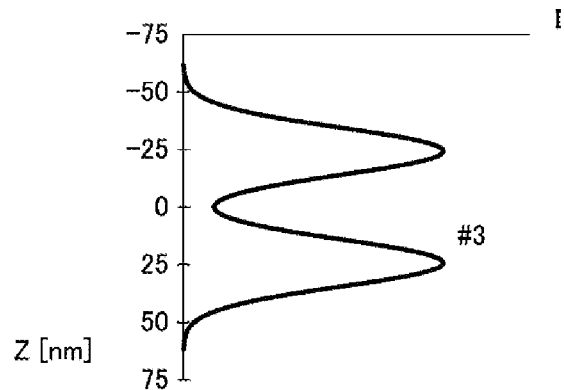
FIG. 9 is a graph showing the distribution of the focus position, in the exposure apparatus, of the laser light indicated by a spectral waveform #3 shown in FIG. 6.

FIGS. 7 to 9 are graphs showing the distribution of the focus positions in the exposure apparatus 100 of the laser light indicated by the spectral waveforms #1 to #3 shown in FIG. 6. In each of FIGS. 7 to 9, the vertical axis represents the focus position along the Z axis shown in FIG. 1, and the horizontal axis represents the light intensity of the wavelength component focused on each focus position. The longitudinal chromatic aberration of the projection optical system 102 of the exposure apparatus 100 is assumed to be 250 nm/pm. That is, the difference in the focusing position per wavelength difference of 1 pm is assumed to be 250 nm.

The distribution shapes of the focus position shown in FIGS. 7 to 9 substantially correspond to the shapes of the spectral waveforms #1 to #3 shown in FIG. 6. In FIG. 7, the distribution shape is such that the wavelength component focused at the position of Z=0 is the maximum. In FIG. 8, the distribution shape is asymmetric such that the focus centroid is located at a position on the +direction side with respect to Z=0. In FIG. 9, the distribution shape is such that the peak of the focused wavelength component is located at two separated positions.

Even when the spectral line width E95 is the same as described above, the distribution shape of the focus positions in the exposure apparatus 100 may be varied, and the exposure performance may be varied.

Figure 10:
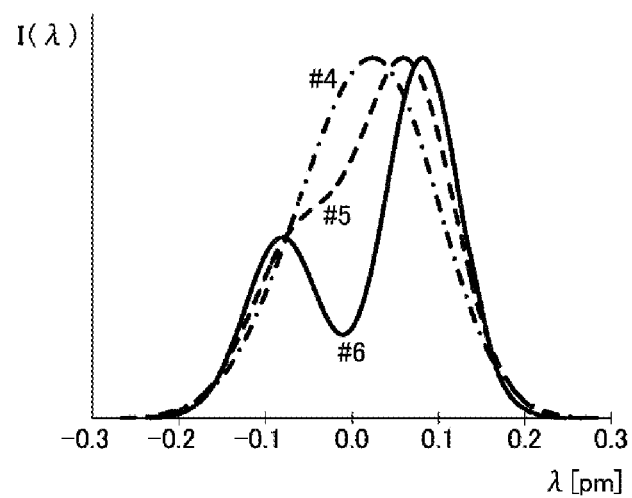
FIG. 10 is a graph showing further other examples of the spectral waveform of the laser light.
Figure 11:
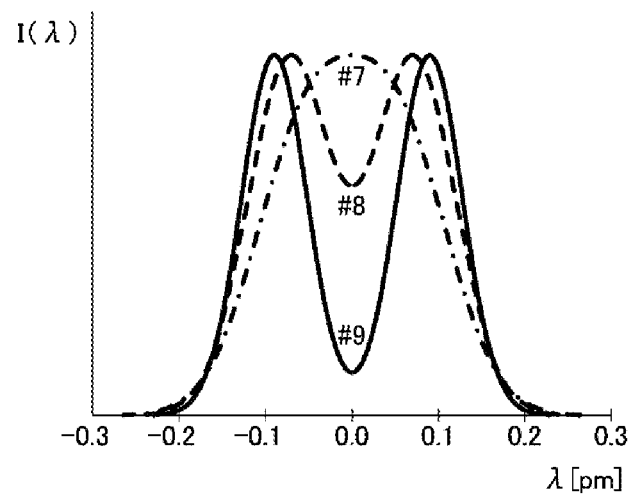
FIG. 11 is a graph showing further other examples of the spectral waveform of the laser light.

FIGS. 10 and 11 are graphs showing further other examples of the spectral waveform of the laser light. In FIGS. 10 and 11, the horizontal axis represents the wavelength deviation $\Delta\lambda$, from the center wavelength. Although the spectral line widths E95 of spectral waveforms #4 to #6 shown in FIG. 10 and spectral waveforms #7 to #9 shown in FIG. 11 are all 0.3 pm, the spectral waveforms #4 to #9 differ in shapes from each other. The spectral waveforms #4 to #6 each have an asymmetric spectral distribution in which the peak wavelength is shifted from the center wavelength toward the longer wavelength side, and the differences each between the center wavelength and the peak wavelength are different from each other. The spectral waveforms #7 to #9 are symmetrical, and the spectral waveform #7 has a gentle curve in the vicinity of the peak as compared with the spectral waveform #1 (see FIG. 6) having a Gaussian distribution. The spectral waveforms #8 and #9 each have a spectral distribution in which the peak wavelengths are located at two separated positions, and the differences each between the center wavelength and the peak wavelength are different from each other.

The imaging performance in the exposure apparatus 100 was evaluated using the spectral waveforms #4 to #9 as follows.

Figure 12:
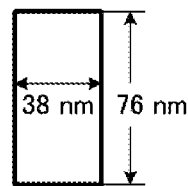
FIG. 12 shows a rectangular imaging pattern used for evaluation of imaging performance.

FIG. 12 shows a rectangular imaging pattern used for evaluation of imaging performance. A mask used herein was designed so that, when the spectral waveform #1 having the Gaussian distribution was used, a rectangular imaging pattern having a lateral dimension of 38 nm and a vertical dimension of 76 nm was formed on the wafer surface by the projection optical system 102. The longitudinal chromatic aberration of the projection optical system 102 was assumed to be 250 nm/pm. Deviation ΔCD from the vertical dimension of 76 nm was obtained by simulation in a case that the exposure amount was adjusted so that the lateral dimension of the imaging pattern on the wafer surface became 38 nm when the spectral waveforms #4 to #9 were used.

Figure 13:
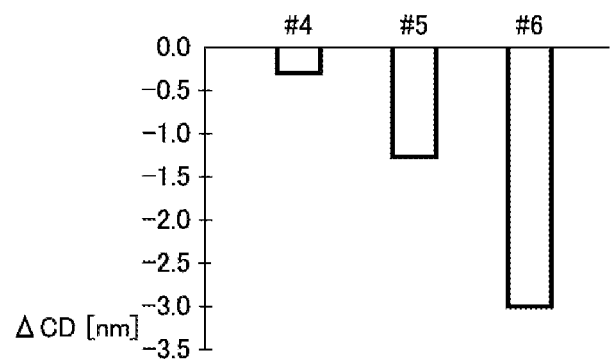
FIG. 13 is a graph showing a simulation result of the imaging performance in the exposure apparatus.
Figure 14:
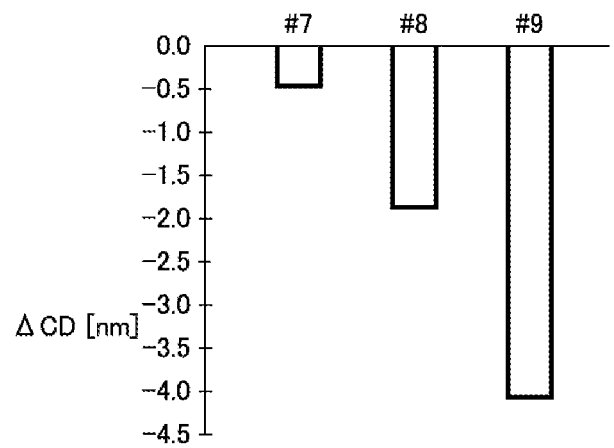
FIG. 14 is a graph showing a simulation result of the imaging performance in the exposure apparatus.

FIGS. 13 and 14 are graphs showing simulation results of the imaging performance in the exposure apparatus 100. FIG. 13 shows a case in which the spectral waveforms #4 to #6 shown in FIG. 10 are used, and FIG. 14 shows a case in which the spectral waveforms #7 to #9 shown in FIG. 11 are used.

As shown in FIG. 13, as the difference between the center wavelength and the peak wavelength increases and the asymmetry increases, the dimensional error on the wafer surface may increase. Also, as shown in FIG. 14, even in a case of a symmetrical spectral distribution, as the difference from the Gaussian distribution increases, the dimensional error on the wafer surface may increase.

Thus, even when the spectral line width E95 remains the same, there is a case that the imaging performance in the exposure apparatus 100 is varied, and the required exposure performance may not be obtained simply by adjusting the spectral line width E95 to the target value.

In the embodiments described below, spectrum control for obtaining the required exposure performance is enabled by performing waveform evaluation considering not only the spectral line width but also the shape of the spectral waveform.

Figure 15:
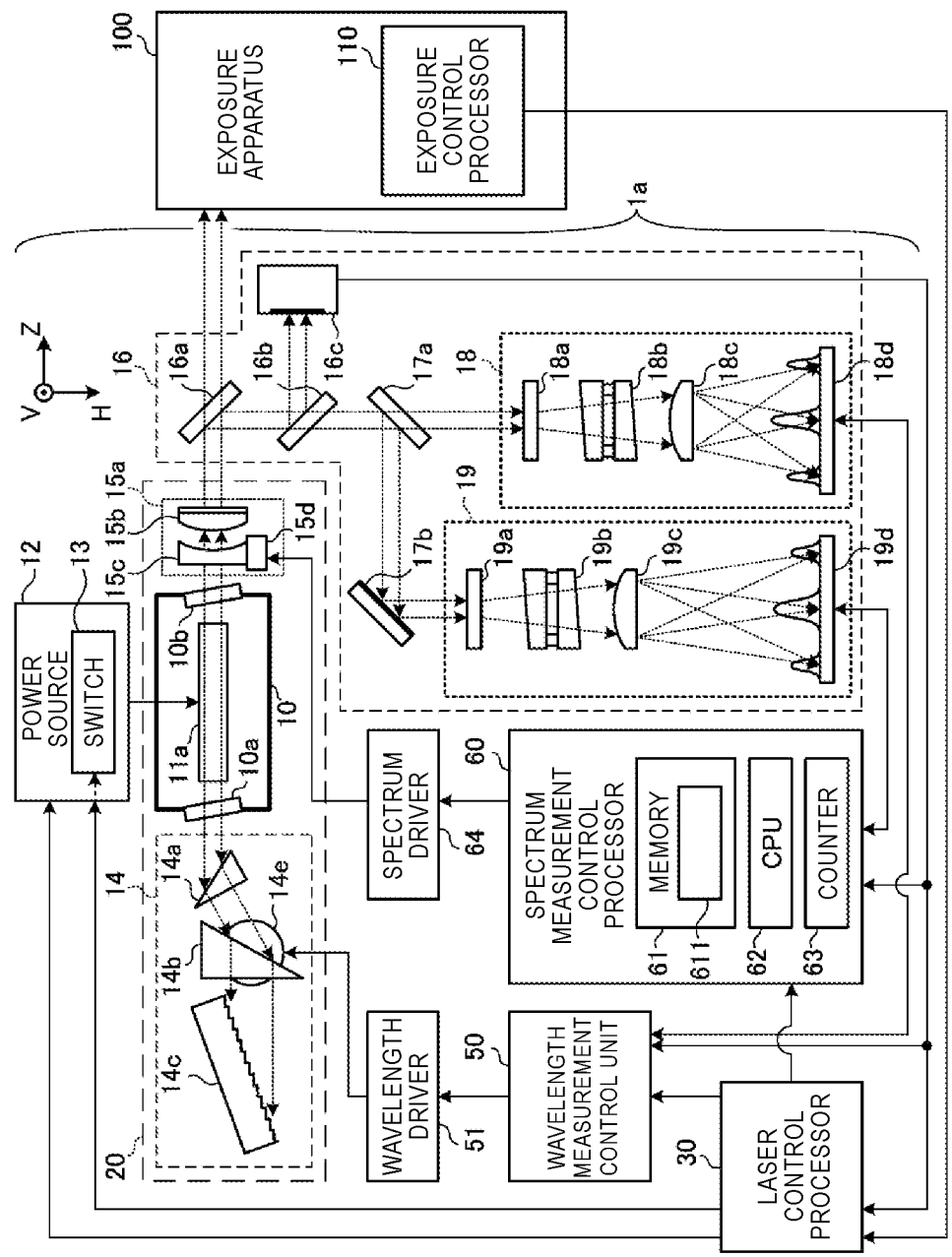
FIG. 15 schematically shows the configuration of the laser device according to an embodiment of the present disclosure.

2. LASER DEVICE 1A WHICH CALCULATES SPECTRUM EVALUATION VALUE V BY INTEGRATING PRODUCT OF ESTIMATION SPECTRAL WAVEFORM I(λ) AND FUNCTION (λ-λC)² OF WAVELENGTH DEVIATION 2.1 Configuration FIG. 15 schematically shows the configuration of a laser device 1a according to an embodiment of the present disclosure. In the laser device 1a, the memory 61 included in the spectrum measurement control processor 60 stores a spectrum evaluation value calculation program 611.

When the CPU 62 executes the spectrum evaluation value calculation program 611, the spectrum measurement control processor 60 performs the following calculation.

The spectrum measurement control processor 60 calculates a centroid wavelength λc of the estimation spectral waveform I(λ) by the following Equation 2.

$$\lambda c = \frac{\int I(\lambda)\lambda d\lambda}{\int I(\lambda)d\lambda} \quad \text{[Equation 2]}$$

The numerator in Equation 2 is a value obtained by integrating the product of the light intensity represented by the estimation spectral waveform I(λ) and the wavelength over the wavelength range of the estimation spectral waveform I(λ), and corresponds to the second integration value in the present disclosure. The denominator in Equation λ is a value obtained by integrating the light intensity represented by the estimation spectral waveform I(λ) over the wavelength range of the estimation spectral waveform I(λ), and corresponds to the third integration value in the present disclosure. The centroid wavelength λc is an example of the representative wavelength in the present disclosure.

The spectrum measurement control processor 60 calculates a spectrum evaluation value V of the estimation spectral waveform I(λ) by the following Equation 3.

$$V = \frac{\int I(\lambda)(\lambda - \lambda c)^2 d\lambda}{\lambda s \int I(\lambda)d\lambda} \quad \text{[Equation 3]}$$

The numerator in Equation 3 is a value obtained by integrating the product of the light intensity represented by the estimation spectral waveform I(λ) and a function (λ-λc)² of the wavelength deviation from the centroid wavelength λc over the wavelength range of the estimation spectral waveform I(λ), and corresponds to the first integration value in the present disclosure. The spectrum evaluation value V corresponds to the evaluation value in the present disclosure.

The denominator in Equation 3 is the product of a constant λs and the third integration value. The constant λs may be any of the following (1) to (4).
(1) 1
(2) The centroid wavelength λc
(3) The spectral line width E95 of the estimation spectral waveform I(λ)
(4) The standard deviation of a spectral waveform having the Gaussian distribution with the same spectral line width E95 as the estimation spectral waveform I(λ)

When the constant λs is set to 1 as (1), the spectrum evaluation value V has a dimension of the square of the wavelength λ. On the other hand, by performing division with the constant λs obtained from a function of the wavelength as (2) to (4), the spectrum evaluation value V can have a dimension of the wavelength λ.

2.2 Measurement Operation of Spectrum Evaluation Value V

Figure 16:
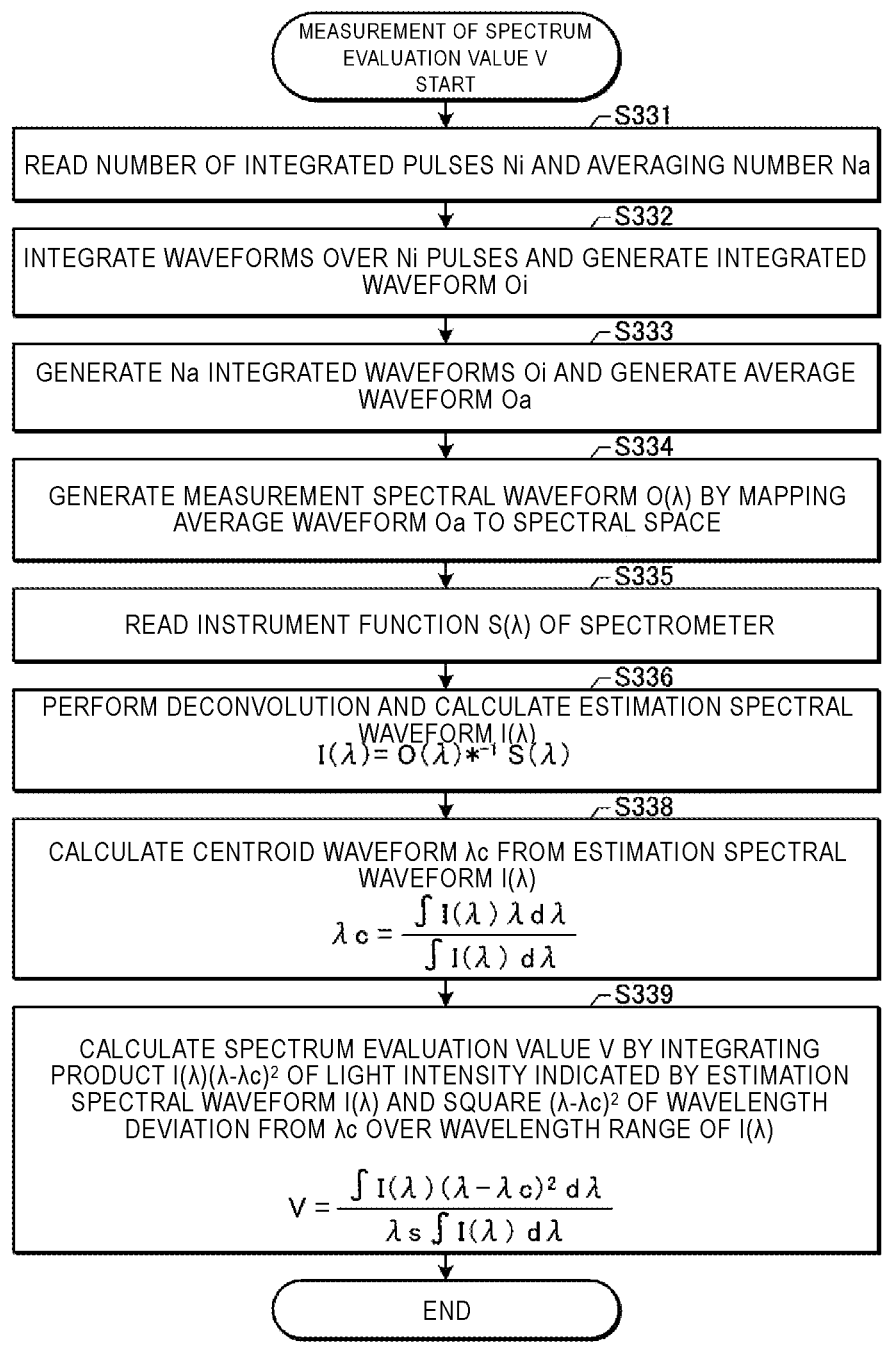
FIG. 16 is a flowchart showing the procedure of measuring a spectrum evaluation value V in the embodiment.

FIG. 16 is a flowchart showing the procedure of measuring the spectrum evaluation value V in the embodiment. The processes of S331 to S336 in FIG. 16 are similar to the corresponding processes in FIG. 4. After S336, the spectrum measurement control processor 60 advances processing to S338.

In S338, the spectrum measurement control processor 60 calculates the centroid wavelength λc of the estimation spectral waveform I(λ) by Equation 2.

In S339, the spectrum measurement control processor 60 calculates the spectrum evaluation value V of the estimation spectral waveform I(λ) by Equation 3.

After S339, the spectrum measurement control processor 60 ends processing of the present flowchart.

2.3 Comparison with Spectral Line Width E95

Next, the usefulness of the spectrum evaluation value V and the evaluation method using the spectrum evaluation value V will be described in comparison with the spectral line width E95. As will be described below, the spectrum evaluation value V can be applied to the shape of various imaging patterns.

Figure 17:
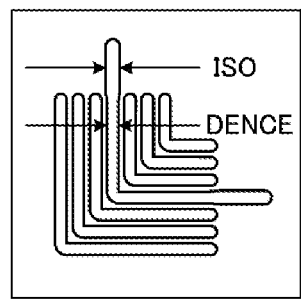
FIG. 17 shows the imaging pattern used to compare the usefulness of the spectrum evaluation value V and the spectral line width E95.

FIG. 17 shows the imaging pattern used to compare the usefulness between the spectrum evaluation value V and the spectral line width E95. The imaging pattern shown in FIG. 17 includes two types of patterns, i.e., a DENCE pattern in which a plurality of exposure regions are densely arranged, and an ISO pattern located at a position away from other exposure regions. Deviation from a reference dimension of the ISO pattern, in a case in which the exposure amount is adjusted so that the dimension of the DENCE pattern is 45 nm, is defined as ΔCD. The reference dimension of the ISO pattern is the dimension of the ISO pattern when the spectral line width E95 is 0.01 pm.

Figure 18:
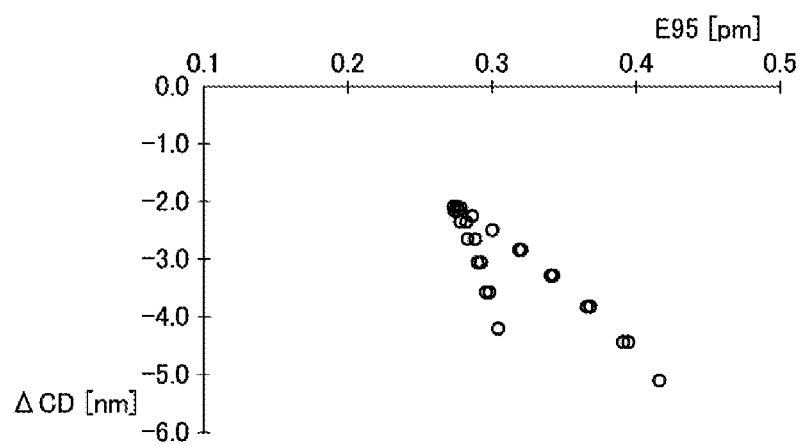
FIG. 18 is a graph showing the relationship between the spectral line width E95 and ΔCD in the imaging pattern of FIG. 17
Figure 19:
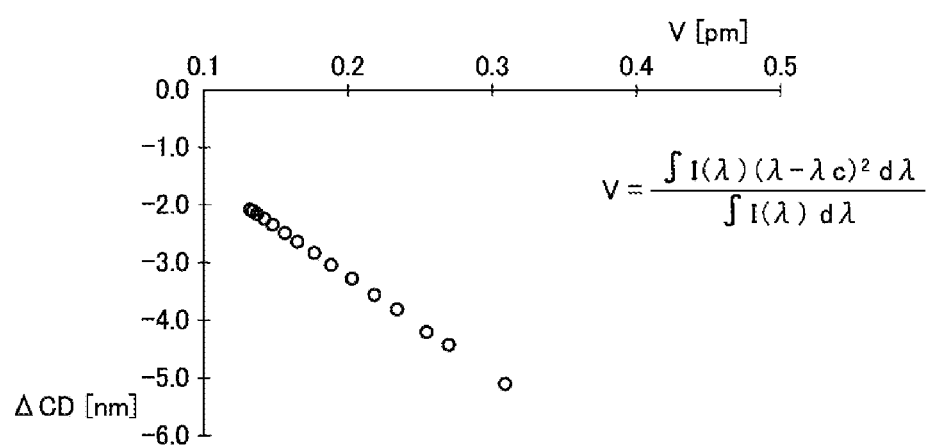
FIG. 19 is a graph showing the relationship between the spectral line width E95 and ΔCD in the imaging pattern of FIG. 17

FIG. 18 is a graph showing the relationship between the spectral line width E95 and ΔCD in the imaging pattern of FIG. 17, and FIG. 19 is a graph showing the relationship between the spectrum evaluation value V and ΔCD in the imaging pattern of FIG. 17. For each of FIGS. 18 and 19, simulation was performed using a large number of variations including the spectral waveforms exemplified in FIGS. 10 and 11, and ΔCD was plotted.

In FIG. 18, there are two trends in the rate of change in ΔCD with respect to the change in the spectral line width E95. Therefore, even when the spectral line width E95 is measured, the imaging performance on the wafer surface may not be accurately known in some cases.

In FIG. 19, the relationship between the spectrum evaluation value V and ΔCD shows substantially a single straight line. Therefore, by measuring the spectrum evaluation value V, it is possible to know the imaging performance on the wafer surface. By controlling the spectrum evaluation value V to a constant target evaluation value, a required imaging performance can be achieved.

Figure 20:
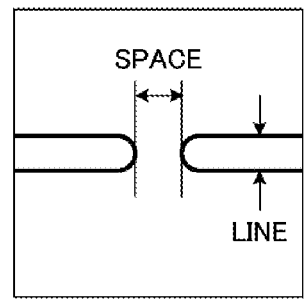
FIG. 20 shows another imaging pattern used to compare the usefulness of the spectrum evaluation value V and the spectral line width E95.

FIG. 20 shows another imaging pattern used to compare the usefulness between the spectrum evaluation value V and the spectral line width E95. The imaging pattern shown in FIG. 20 includes two types of patterns, i.e., a LINE pattern imitating a wiring and a SPACE pattern imitating a gap between adjacent wirings. Deviation from a reference dimension of the SPACE pattern, in a case in which the exposure amount is adjusted so that the dimension of the LINE pattern is 100 nm, is defined as ΔCD.

Figure 21:
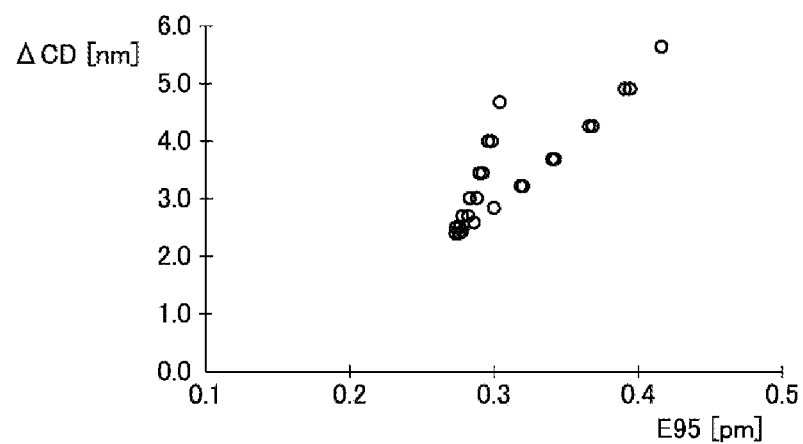
FIG. 21 is a graph showing the relationship between the spectral line width E95 and ΔCD in the imaging pattern of FIG. 20
Figure 22:
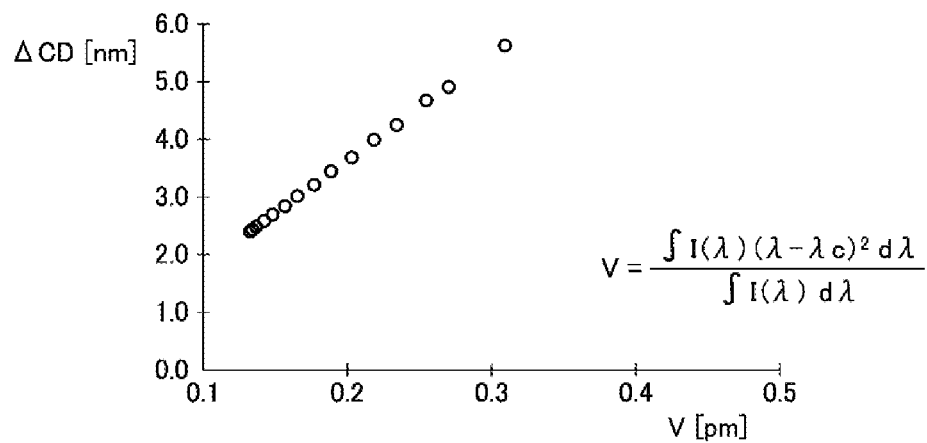
FIG. 22 is a graph showing the relationship between the spectrum evaluation value V and ΔCD in the imaging pattern of FIG. 20

FIG. 21 is a graph showing the relationship between the spectral line width E95 and ΔCD in the imaging pattern of FIG. 20, and FIG. 22 is a graph showing the relationship between the spectrum evaluation value V and ΔCD in the imaging pattern of FIG. 20. For each of FIGS. 21 and 22, simulation was performed using a large number of variations including the spectral waveforms exemplified in FIGS. 10 and 11, and ΔCD was plotted.

In FIG. 21, there are two trends in the rate of change in ΔCD with respect to the change in the spectral line width E95. Therefore, even when the spectral line width E95 is measured, the imaging performance on the wafer surface may not be accurately known in some cases.

In FIG. 22, the relationship between the spectrum evaluation value V and ΔCD shows substantially a single straight line. Therefore, by measuring the spectrum evaluation value V, it is possible to know the imaging performance on the wafer surface. By controlling the spectrum evaluation value V to a constant target evaluation value, a required imaging performance can be achieved.

2.4 Modification of Spectrum Evaluation Value V

In Equation 3, the square $(\lambda-\lambda c)^2$ of the wavelength deviation λ–λc from the centroid wavelength λc is used, but the present disclosure is not limited thereto. The spectrum evaluation value V may be calculated by the following Equation 4.

$$V = \frac{\int I(\lambda)|\lambda - \lambda c|^N d\lambda}{\int I(\lambda) d\lambda} \quad \text{[Equation 4]}$$

Equation 4 is different from Equation 3 in that the absolute value of the wavelength deviation λ–λc is raised to the N-th power instead of raising the wavelength deviation λ–λc to the second power in Equation 3. The exponent N is a positive number. Equation 4 when the value of the exponent N is 2 is equivalent to Equation 3 when λs is 1.

Figure 23:
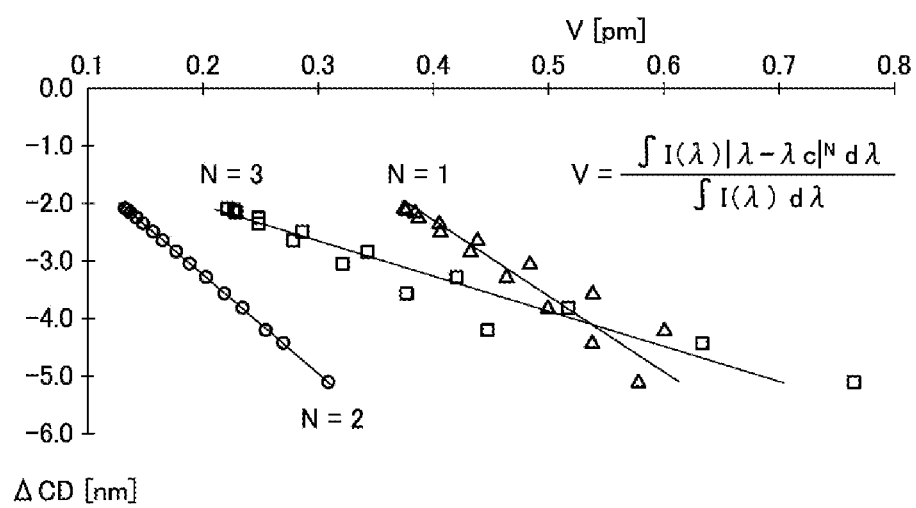
FIG. 23 is a graph showing the relationship between the spectrum evaluation value V of Equation 4 and ΔCD in the imaging pattern of FIG. 17.
Figure 24:
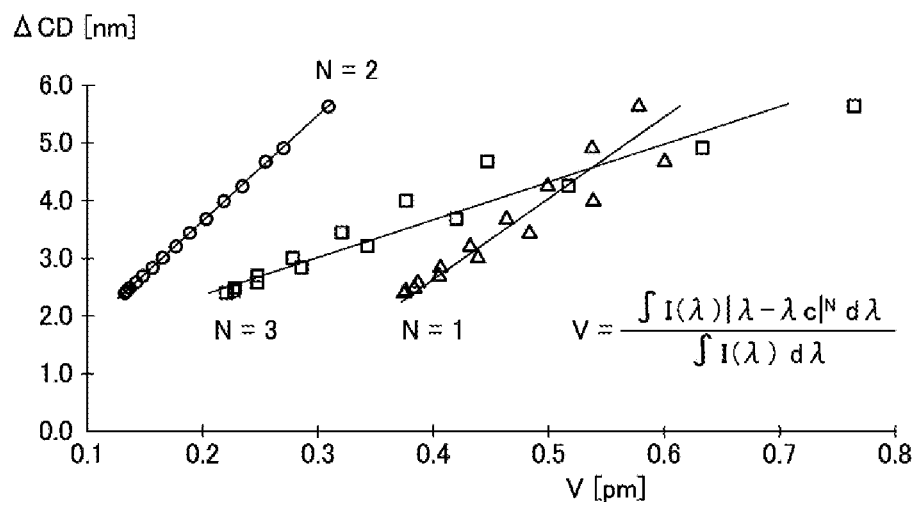
FIG. 24 is a graph showing the relationship between the spectrum evaluation value V of Equation 4 and ΔCD in the imaging pattern of FIG. 20.

FIG. 23 is a graph showing the relationship between the spectrum evaluation value V of Equation 4 and ΔCD in the imaging pattern of FIG. 17. FIG. 24 is a graph showing the relationship between the spectrum evaluation value V of Equation 4 and ΔCD in the imaging pattern of FIG. 20. In FIGS. 23 and 24, the simulation results when the value of the exponent N in Equation 4 is 1, 2, and 3 are shown together with the respective regression lines. In any case in which the value of the exponent N is 1, 2, and 3, a correlation is recognized between the spectrum evaluation value V and ΔCD. By measuring the spectrum evaluation value V as described above, it is possible to know the imaging performance on the wafer surface.

The coefficient of determination indicating the goodness of fit of the regression line is highest when the value of the exponent N is 2 in both of FIGS. 23 and 24. The value of the exponent N is preferably 1.9 or more and 2.1 or less.

2.5 Operation of Spectrum Control

Figure 25:
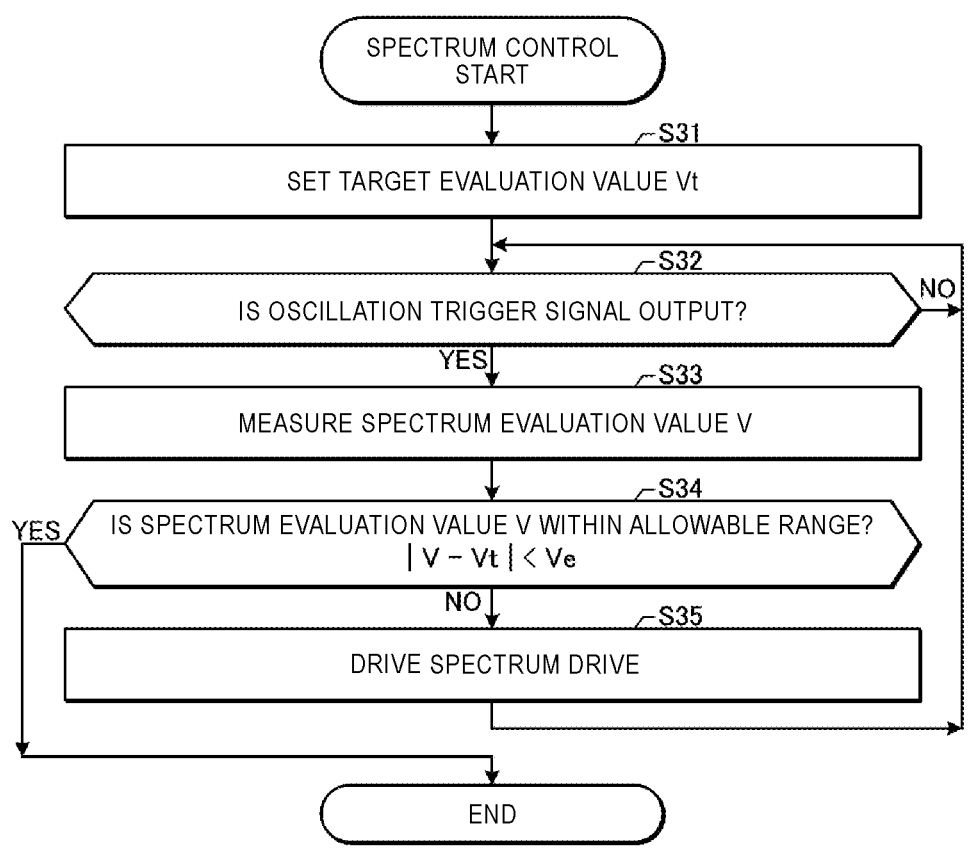
FIG. 25 is a flowchart showing the procedure of spectrum control in the embodiment.

FIG. 25 is a flowchart showing the procedure of spectrum control in the embodiment. The spectrum measurement control processor 60 controls the spectral waveform adjuster 15*a* using the spectrum evaluation value V and a target evaluation value Vt in the following manner.

In S31, the spectrum measurement control processor 60 sets the target evaluation value Vt. For example, the spectrum measurement control processor 60 receives optical characteristic data of the exposure apparatus 100 from the exposure apparatus 100, and sets the target evaluation value Vt calculated from the optical characteristic.

In S32, the spectrum measurement control processor 60 determines whether or not the oscillation trigger signal is output from the laser control processor 30.

When the oscillation trigger signal is not output (S32: NO), the spectrum measurement control processor 60 waits until the oscillation trigger signal is output.

When the oscillation trigger signal is output (S32:YES), the laser light is output from the laser oscillator 20. The spectrum measurement control processor 60 advances processing to S33.

In S33, the spectrum measurement control processor 60 measures the spectrum evaluation value V using the laser light output from the laser oscillator 20. The process of S33 is performed in the procedure described with reference to FIG. 16.

In S34, the spectrum measurement control processor 60 compares the spectrum evaluation value V with the target evaluation value Vt, and determines whether or not the spectrum evaluation value V is within an allowable range. For example, it is determined whether or not the absolute value of the difference between the spectrum evaluation value V and the target evaluation value Vt is smaller than an allowable error Ve.

When the spectrum evaluation value V is not within the allowable range in S34 (S34:NO), the spectrum measurement control processor 60 advances processing to S35.

In S35, the spectrum measurement control processor 60 controls the spectral waveform adjuster 15a by transmitting the control signal to drive the spectrum driver 64. For example, when the spectrum evaluation value V is larger than the target evaluation value Vt, the spectral waveform adjuster 15a is controlled to reduce the spectral line width, and when the spectrum evaluation value V is smaller than the target evaluation value Vt, the spectral waveform adjuster is controlled to increase the spectral line width.

After S35, the spectrum measurement control processor returns processing to S32.

When the spectrum evaluation value V is within the allowable range in S34 (S34:YES), the spectrum measurement control processor 60 ends processing of the present flowchart. Thereafter, the laser device 1a continues outputting the laser light with the setting of the spectral waveform adjuster 15a fixed. Alternatively, the spectrum measurement control processor 60 may return processing to S32, and repeatedly perform the measurement and determination of the spectrum evaluation value V while continuing outputting the laser light.

2.6 Modification of Spectral Waveform Adjuster 2.6.1 Configuration

Figure 26:
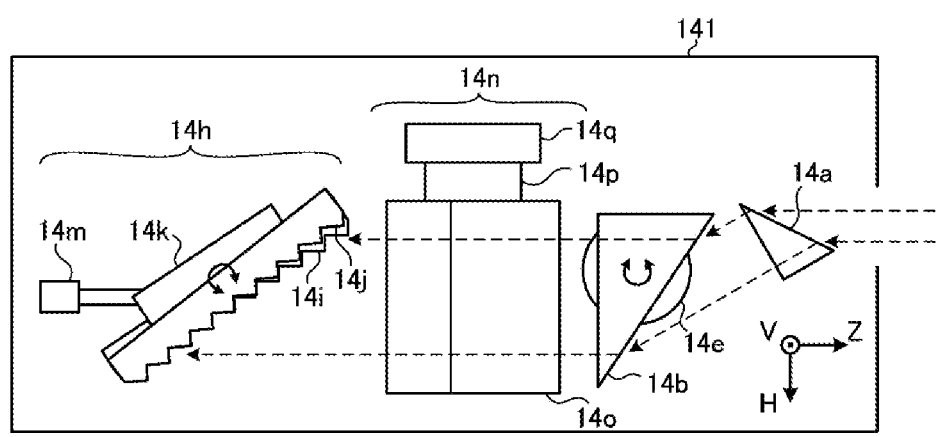
FIG. 26 schematically shows the configuration of a modification of a spectral waveform adjuster.
Figure 27:
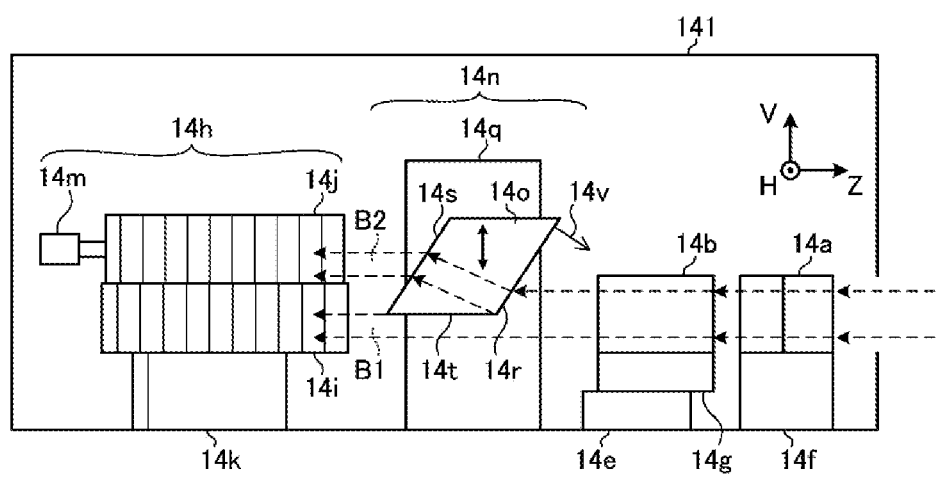
FIG. 27 schematically shows the configuration of the modification of the spectral waveform adjuster.

FIGS. 26 and 27 schematically show the configuration of a modification of the spectral waveform adjuster. In the modification, a line narrowing device 141 configures the spectral waveform adjuster. FIG. 26 shows the line narrowing device 141 viewed in the −V direction, and FIG. 27 shows the line narrowing device 141 viewed in the −H direction.

The line narrowing device 141 includes a grating system 14h instead of the grating 14c (see FIG. 2). The grating system 14h includes gratings 14i, 14j.

The gratings 14i, 14j are arranged at positions different from each other in the V-axis direction. The direction of the grooves of each of the gratings 14i, 14j coincides with the V-axis direction.

The gratings 14i, 14j are supported by a holder 14k. However, the grating 14i is supported to maintain a constant posture, while the grating 14j is rotatable about an axis parallel to the V axis by a rotation mechanism 14m.

The line narrowing device 141 includes a beam separation optical system 14n between the prism 14b and the grating system 14h. The beam separation optical system 14n includes a plane-parallel substrate 14o.

The plane-parallel substrate 14o is arranged to overlap a part of the cross section of the optical path of a light beam having passed through the prism 14b. The plane-parallel substrate 14o is arranged on the optical path of the light beam between the prism 14b and the grating 14j. The plane-parallel substrate 14o is supported by a holder 14p.

The plane-parallel substrate 14o is configured to be movable in the direction parallel to the V axis by a linear stage 14q.

The plane-parallel substrate 14o includes an incident surface 14r on which a part of the light beam having passed through the prism 14b enters, and an output surface 14s from which the light beam that has been incident on the plane-parallel substrate 14o through the incident surface 14r is output from the inside of the plane-parallel substrate 14o toward the grating 14j. Both the incident surface 14r and the output surface 14s are parallel to the H axis, and the incident surface 14r and the output surface 14s are parallel to each other. The incident surface 14r and the output surface 14s are inclined with respect to the incident direction of the light beam to refract the light beam. Specifically, a normal vector 14v of the incident surface 14r is parallel to the VZ plane, and the normal vector 14v has direction components in the −V direction and the +Z direction.

The plane-parallel substrate 14o further includes an end surface 14t to face a first portion B1 of the light beam. The end surface 14t forms an acute angle with the output surface 14s. The end surface 14t may be parallel to the HZ plane.

The prism 14a is supported by a holder 14f. The prism 14b is supported by a holder 14g. Alternatively, the prism 14b may be directly supported by the rotation stage 14e without the holder 14g as in FIG. 2.

2.6.2 Operation

The first portion B1 of the light beam having passed through the prism 14b passes through the outside of the plane-parallel substrate 14o and is incident on the grating 14i. A second portion B2 of the light beam is transmitted through the inside of the plane-parallel substrate 14o and is incident on the grating 14j. At this time, the plane-parallel substrate 14o shifts the optical path axis of the second portion B2 of the light beam in the +V direction with respect to the optical path axis of the first portion B1. The optical path axis refers to the center axis of the optical path. Thus, the plane-parallel substrate 14o separates the second portion B2 of the light beam from the first portion B1 by transmitting a part of the light beam.

The light incident on the gratings 14i, 14j is reflected by a plurality of the grooves of each of the gratings 14i, 14j and is diffracted in a direction corresponding to the wavelength of the light. Thus, the light reflected by the plurality of grooves of each of the gratings 14i, 14j is dispersed in a plane parallel to the HZ plane. The grating 14i is arranged in the Littrow arrangement, which causes the incident angle of the light beam incident on the grating 14i from the prism 14b to coincide with the diffraction angle of the diffracted light having a desired first wavelength. The grating 14j is arranged in the Littrow arrangement, which causes the incident angle of the light beam incident on the grating 14j from the prism 14b to coincide with the diffraction angle of the diffracted light having a desired second wavelength. When the incident angles of the light beams that are incident on the gratings 14i, 14j from the prism 14b are different from each other, a wavelength difference occurs between the first wavelength of the diffracted light returned from the grating 14j to the prism 14b and the second wavelength of the diffracted light returned from the grating 14j to the prism 14b.

In FIGS. 26 and 27, broken-line arrows indicating the light beam show only the direction from the prism 14a toward the gratings 14i, 14j, but the light beam having the selected wavelength by the line narrowing device 141 is directed from the gratings 14i, 14j toward the prism 14a in the paths opposite to these broken-line arrows.

The prisms 14a, 14b reduce the beam width of the light returned from the gratings 14i, 14j in a plane parallel to the HZ plane and return the light into the laser chamber 10 through the window 10a (see FIGS. 2 and 15).

When the rotation stage 14e slightly rotates the prism 14b, the travel direction of the light beam output from the prism 14b toward the gratings 14i, 14j slightly changes in a plane parallel to the HZ plane. Thus, the incident angle of the light beam incident on the gratings 14i, 14j from the second prism 14b is slightly changed. Thus, both the first wavelength and the second wavelength change.

When the rotation mechanism 14m slightly rotates the grating 14j, the incident angle of the light beam incident on the grating 14i from the prism 14b does not change, but the incident angle of the light beam incident on the grating 14j from the prism 14b slightly changes. Therefore, the wavelength difference between the first wavelength and the second wavelength changes.

With the above configuration and operation, the first wavelength and the second wavelength of the light beam output from the window 10a of the laser chamber 10 is selected and returned to the laser chamber 10. Thus, the laser device 1a can output the laser light including two peak wavelengths. By controlling the rotation stage 14e and the rotation mechanism 14m, the first wavelength and the second wavelength can also be set separately.

Further, the linear stage 14q changes the position of the plane-parallel substrate 14o in the V-axis direction, thereby changing the energy ratio between the first portion B1 and the second portion B2.

When the plane-parallel substrate 14o is moved in the −V-direction, the second portion B2 of the light beam incident on the plane-parallel substrate 14o increases and the light incident on the grating 14j increases. Therefore, the energy of the second wavelength component included in the laser light increases.

When the plane-parallel substrate 14o is moved in the +V-direction, the second portion B2 of the light beam incident on the plane-parallel substrate 14o decreases and the light incident on the grating 14j decreases. Therefore, the energy of the second wavelength component included in the laser light decreases.

According to this, the laser light including two peak wavelengths exemplified in FIG. 11 or the laser light having an asymmetric spectral waveform exemplified in FIG. 10 can be output, and the spectral waveform of the laser light can be controlled.

2.6 Other Configuration Examples

The following configuration (1) or (2) may be adopted instead of the configuration described with reference to FIGS. 26 and 27.

(1) Instead of replacing the grating 14c (see FIG. 2) with the gratings 14i, 14j arranged at positions different from each other in the V direction, the prism 14b may be replaced with a first prism and a second prism (not shown) arranged at positions different from each other in the V direction. By allowing each of the first prism and the second prism to be rotatable about an axis parallel to the V axis, the first wavelength and the second wavelength can be individually controlled. By allowing the first prism and the second prism to be integrally movable in a direction parallel to the V axis the energy ratio between the first wavelength component and the second wavelength component can be controlled.

(2) Instead of replacing the grating 14c (see FIG. 2) with the gratings 14i, 14j arranged at positions different from each other in the V direction, a first mirror and a second mirror (not shown) may be arranged at positions different from each other in the V direction between the prism 14b and the grating 14c. By allowing each of the first mirror and the second mirror to be rotatable about an axis parallel to the V axis, the first wavelength and the second wavelength can be individually controlled. By allowing the first mirror and the second mirror to be integrally movable in a direction parallel to the V axis, the energy ratio between the first wavelength component and the second wavelength component can be controlled.

2.7 Effect (1) According to the embodiment of the present disclosure, the laser device 1a connectable to the exposure apparatus 100 includes a spectrometer 19 that acquires the average waveform Oa from the interference pattern of the laser light output from the laser device 1a, and the spectrum measurement control processor 60. The spectrum measurement control processor 60 is configured to calculate the estimation spectral waveform $I(\lambda)$ indicating the relationship between the wavelength $\lambda$ and the light intensity using the average waveform Oa, calculate the representative wavelength included in the wavelength range of the estimation spectral waveform $I(\lambda)$, and calculate the spectrum evaluation value V using the first integration value obtained by integrating, over the wavelength range, the product of the function of the wavelength deviation $\lambda - \lambda c$ from the representative wavelength and the light intensity indicated by the estimation spectral waveform $I(\lambda)$.

According to this, it is possible to appropriately evaluate the exposure performance in the exposure apparatus 100 even for the laser light having a spectral waveform different from the spectral waveform having the Gaussian distribution. Further, the spectrum evaluation value V can be applied to the shape of various imaging patterns. Therefore, it is possible to appropriately perform the spectrum control for realizing the required exposure performance.

(2) According to the embodiment, the spectrum measurement control processor 60 generates the measurement spectral waveform $O(\lambda)$ by mapping the average waveform Oa to the spectral space, and calculates the estimation spectral waveform $I(\lambda)$ by performing deconvolution on the measurement spectral waveform $O(\lambda)$ with the instrument function $S(\lambda)$ of the spectrometer 19.

According to this, it is possible to appropriately evaluate the exposure performance in the exposure apparatus 100 by removing the influence of the instrument function $S(\lambda)$ of the spectrometer 19.

(3) According to the embodiment, the representative wavelength is the centroid wavelength $\lambda c$ of the estimation spectral waveform $I(\lambda)$.

According to this, even for an asymmetric spectral waveform in which the center wavelength and the centroid wavelength $\lambda c$ are different from each other, the exposure performance in the exposure apparatus 100 can be appropriately evaluated.

(4) According to the embodiment, the spectrum measurement control processor 60 calculates the centroid wavelength $\lambda c$ by dividing the second integration value obtained by integrating, over the wavelength range, the product of the wavelength $\lambda$ and the light intensity represented by the estimation spectral waveform $I(\lambda)$ by the third integration value obtained by integrating, over the wavelength range, the light intensity represented by the estimation spectral waveform $I(\lambda)$.

According to this, even for an asymmetric spectral waveform in which the center wavelength and the centroid wavelength $\lambda c$ are different from each other or a spectral waveform having a plurality of peaks, it is possible to appropriately evaluate the exposure performance in the exposure apparatus 100.

(5) According to the embodiment, the function of the wavelength deviation $\lambda-\lambda c$ is an exponential of an absolute value $12c1$ of the wavelength deviation $\lambda-\lambda c$, where the exponent N is a positive number.

According to this, it is possible to appropriately evaluate the exposure performance in the exposure apparatus 100 using the spectrum evaluation value V.

(6) According to the embodiment, the exponent N is 1.9 or more and 2.1 or less.

According to this, it is possible to evaluate the exposure performance more appropriately in the exposure apparatus 100 using the spectrum evaluation value V.

(7) According to the embodiment, the spectrum measurement control processor 60 calculates the spectrum evaluation value V by dividing the first integration value by the third integration value.

According to this, by performing dividing by the third integration value, it is possible to evaluate the exposure performance in accordance with the spectral waveform regardless of the amount of light.

(8) According to the embodiment, the spectrum measurement control processor 60 calculates the spectrum evaluation value V by dividing the first integration value by the product of the third integration value and the constant $\lambda s$ obtained from the function of the wavelength included in the wavelength range.

According to this, it is possible to appropriately evaluate the exposure performance by lowering the dimension of the wavelength $\lambda$ included in the spectrum evaluation value V.

(9) According to the embodiment, the spectral waveform adjuster 15a which adjusts the spectral waveform of the laser light entering the spectrometer 19 is further provided. The spectrum measurement control processor 60 controls the spectral waveform adjuster 15a using the comparison result between the spectrum evaluation value V and the target evaluation value Vt.

According to this, the required exposure performance can be realized by the control using the spectrum evaluation value V and the target evaluation value Vt.

(10) According to the embodiment, the spectral waveform adjuster 15a is configured to adjust the spectral line width of the laser light. The spectrum measurement control processor 60 controls the spectral waveform adjuster 15a to decrease the spectral line width when the spectrum evaluation value V is larger than the target evaluation value Vt, and controls the spectral waveform adjuster 15a to increase the spectral line width when the spectrum evaluation value V is smaller than the target evaluation value Vt.

According to this, the spectrum evaluation value V can be decreased by decreasing the spectral line width, and the spectrum evaluation value V can be increased by increasing the spectral line width.

3. OTHERS

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A laser device connectable to an exposure apparatus, comprising:
    a spectrometer configured to generate a measurement waveform from an interference pattern of laser light output from the laser device;
    a spectral waveform adjuster configured to adjust a first spectral waveform of the laser light entering the spectrometer; and
    a processor configured to
        calculate the first spectral waveform indicating a relationship between a wavelength and a light intensity using the measurement waveform,
        calculate a representative wavelength included in a wavelength range of the first spectral waveform,
        calculate an evaluation value of the first spectral waveform using a first integration value obtained by integrating, over the wavelength range, a product of a function of a wavelength deviation from the representative wavelength and the light intensity so as to evaluate a spectral line width of the laser light and a shape of the first spectral waveform, and
        control the spectral waveform adjuster based on the evaluation value so as to realize a required exposure performance.

2. The laser device according to claim 1,
    wherein the processor generates a second spectral waveform by mapping the measurement waveform to a spectral space, and calculates the first spectral waveform by performing deconvolution on the second spectral waveform with an instrument function of the spectrometer.

3. The laser device according to claim 1,
    wherein the representative wavelength is a centroid wavelength of the first spectral waveform.

4. The laser device according to claim 3,
    wherein the processor calculates the centroid wavelength by dividing a second integration value obtained by integrating, over the wavelength range, a product of the wavelength and the light intensity by a third integration value obtained by integrating, over the wavelength range, the light intensity.

5. The laser device according to claim 1,
    wherein the function is an exponential of an absolute value of the wavelength deviation, where an exponent thereof is a positive number.

6. The laser device according to claim 5,
    wherein the exponent is 1.9 or more and 2.1 or less.

7. The laser device according to claim 1,
    wherein the processor calculates the evaluation value by dividing the first integration value by a third integration value obtained by integrating, over the wavelength range, the light intensity.

8. The laser device according to claim 1,
wherein the processor calculates the evaluation value by dividing the first integration value by a product of a third integration value obtained by integrating, over the wavelength range, the light intensity and a function of the wavelength included in the wavelength range.

9. The laser device according to claim 1,
wherein the spectral waveform adjuster is configured to adjust the spectral line width of the laser light, and
the processor controls the spectral waveform adjuster to decrease the spectral line width when the evaluation value is larger than a target evaluation value, and controls the spectral waveform adjuster to increase the spectral line width when the evaluation value is smaller than the target evaluation value.

10. The laser device according to claim 1,
wherein the processor calculates and sets a target evaluation value from optical characteristic data received from the exposure apparatus, and
the processor controls the spectral waveform adjuster using a comparison result between the evaluation value and the target evaluation value.

11. The laser device according to claim 1,
wherein the spectral waveform adjuster adjusts the spectral line width of the laser light and the shape of the first spectral waveform.

12. An evaluation method for laser light spectrum, comprising:
generating a measurement waveform from an interference pattern of laser light output from a laser device connectable to an exposure apparatus;
calculating a first spectral waveform indicating a relationship between a wavelength and a light intensity using the measurement waveform;
calculating a representative wavelength included in a wavelength range of the first spectral waveform;
calculating an evaluation value of the first spectral waveform using a first integration value obtained by integrating, over the wavelength range, a product of a function of a wavelength deviation from the representative wavelength and the light intensity so as to evaluate a spectral line width of the laser light and a shape of the first spectral waveform; and
adjusting the first spectral waveform of the laser light using a comparison result between the evaluation value and a target evaluation value so as to realize a required exposure performance.

13. The evaluation method according to claim 12,
wherein a second spectral waveform is generated by mapping the measurement waveform to a spectral space, and the first spectral waveform is calculated by performing deconvolution on the second spectral waveform with an instrument function of a spectrometer having generated the measurement waveform.

14. The evaluation method according to claim 12,
wherein the representative wavelength is a centroid wavelength of the first spectral waveform.

15. The evaluation method according to claim 14,
wherein the centroid wavelength is calculated by dividing a second integration value obtained by integrating, over the wavelength range, a product of the wavelength and the light intensity by a third integration value obtained by integrating, over the wavelength range, the light intensity.

16. The evaluation method according to claim 12,
wherein the function is an exponential of an absolute value of the wavelength deviation, where an exponent thereof is a positive number.

17. The evaluation method according to claim 16,
wherein the exponent is 1.9 or more and 2.1 or less.

18. The evaluation method according to claim 12,
wherein the evaluation value is calculated by dividing the first integration value by a third integration value obtained by integrating, over the wavelength range, the light intensity.

19. The evaluation method according to claim 12,
wherein the evaluation value is calculated by dividing the first integration value by a product of a third integration value obtained by integrating, over the wavelength range, the light intensity and a function of the wavelength included in the wavelength range.

20. An electronic device manufacturing method, comprising:
generating laser light using a laser device;
outputting the laser light to an exposure apparatus; and
exposing a photosensitive substrate to the laser light in the exposure apparatus to manufacture an electronic device,
the laser device including:
a spectrometer configured to generate a measurement waveform from an interference pattern of the laser light output from the laser device connectable to the exposure apparatus; and
a processor configured to calculate a first spectral waveform indicating a relationship between a wavelength and a light intensity using the measurement waveform, calculate a representative wavelength included in a wavelength range of the first spectral waveform, and calculate an evaluation value of the first spectral waveform using a first integration value obtained by integrating, over the wavelength range, a product of a function of a wavelength deviation from the representative wavelength and the light intensity.

* * * * *